(12) United States Patent
Honma et al.

(10) Patent No.: US 7,136,110 B2
(45) Date of Patent: Nov. 14, 2006

(54) IMAGE SIGNAL PROCESSING APPARATUS

(75) Inventors: Yoshihiro Honma, Saitama (JP); Yuji Sakaegi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 553 days.

(21) Appl. No.: 09/878,936

(22) Filed: Jun. 13, 2001

(65) Prior Publication Data

US 2002/0033900 A1 Mar. 21, 2002

(30) Foreign Application Priority Data

Jun. 14, 2000 (JP) ........................ 2000-177890

(51) Int. Cl.
*H04N 5/14* (2006.01)
*G09G 5/00* (2006.01)

(52) U.S. Cl. .................... 348/571; 345/3.2

(58) Field of Classification Search ........... 345/660, 345/3.2, 698, 537, 538, 539, 558, 603; 348/571, 348/581, 582, 578, 455, 456, 554, 556, 792; H04N 5/14

See application file for complete search history.

(56) References Cited

U.S. PATENT DOCUMENTS

| | | | | | |
|---|---|---|---|---|---|
| 3,986,202 | A | * | 10/1976 | Granger | 386/44 |
| 4,719,509 | A | * | 1/1988 | Sakamoto | 348/163 |
| 5,432,905 | A | * | 7/1995 | Hsieh et al. | 345/99 |
| 5,874,937 | A | * | 2/1999 | Kesatoshi | 345/428 |
| 6,061,094 | A | * | 5/2000 | Maietta | 348/446 |
| 6,300,982 | B1 | * | 10/2001 | Koh | 348/569 |
| 6,549,240 | B1 | * | 4/2003 | Reitmeier | 348/459 |
| 6,590,609 | B1 | * | 7/2003 | Kitade et al. | 348/231.6 |

* cited by examiner

*Primary Examiner*—Michael H. Lee
(74) *Attorney, Agent, or Firm*—Fitzpatrick, Cella, Harper & Scinto

(57) ABSTRACT

A resizing unit resizes a captured image or an inputted image and outputs a resized image. A first conversion unit converts the resized image into an RGB image or an image for a TV monitor. A second conversion unit converts the RGB image or the image for the TV monitor into a plurality of serial data.

29 Claims, 27 Drawing Sheets

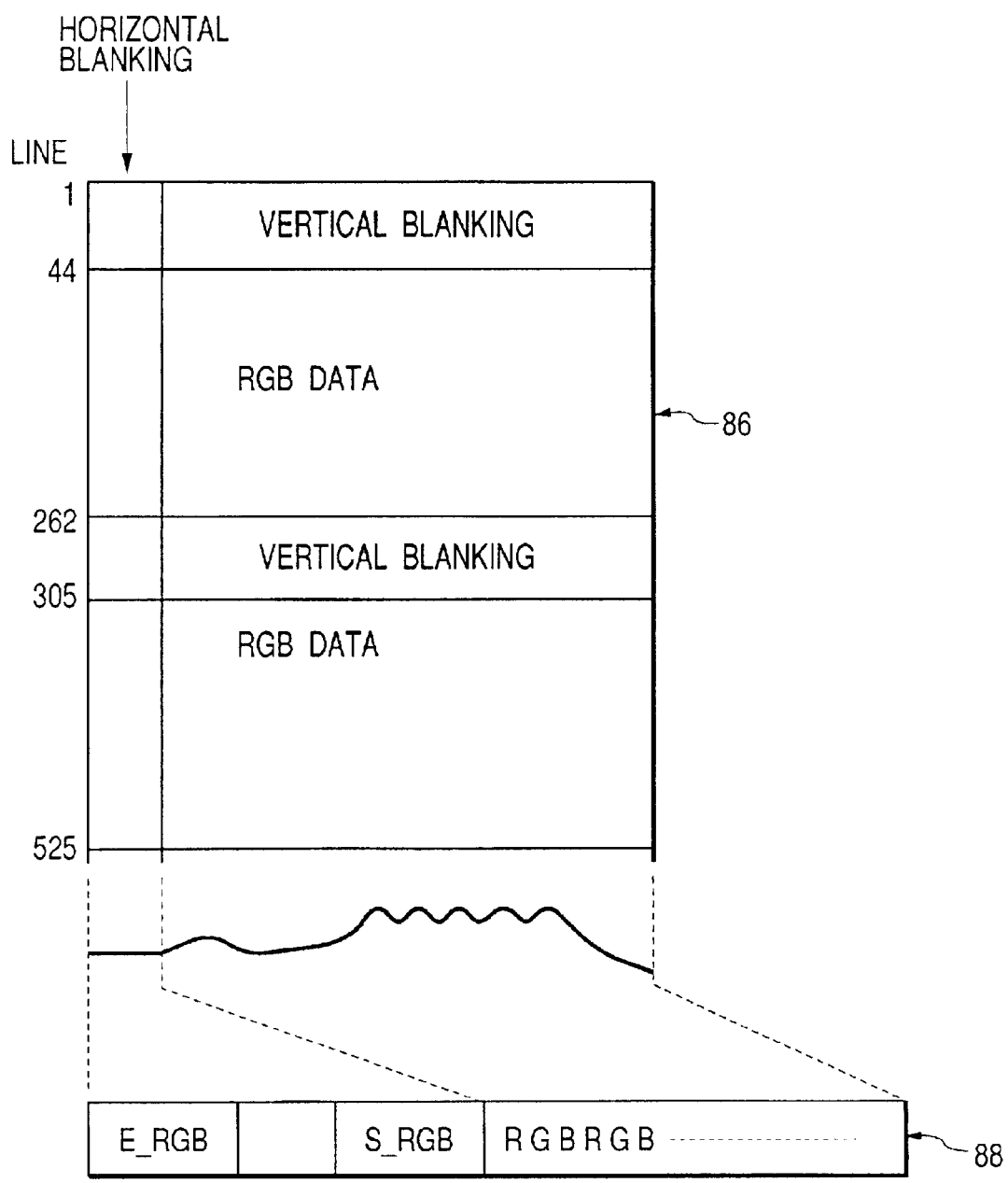

FIG. 6

|   | MSB | | | | | | | LSB |
|---|---|---|---|---|---|---|---|---|
|   | b7 | b6 | b5 | b4 | b3 | b2 | b1 | b0 |
| 1ST WORD | 1 | 1 | 1 | 1 | 1 | 1 | 1 | 1 |
| 2ND WORD | 0 | 0 | 0 | 0 | 0 | 0 | 0 | 0 |
| 3RD WORD | 0 | 0 | 0 | 0 | 0 | 0 | 0 | 0 |
| 4TH WORD | 1 | 1 | V | H | 0 | 0 | 0 | 0 |

V=0
V=1 : VERTICAL BLANKING
H=0 : S_RGB
H=1 : E_RGB

IMAGE SIGNAL PROCESSING APPARATUS

BACKGROUND OF THE INVENTION

1. Field of the Invention

The present invention relates to an image (or video) signal processing apparatus for image display which is suitable for an image pickup apparatus such as a digital camera or the like.

2. Related Background Art

FIG. 27 is a block diagram showing a schematic structure of a conventional image pickup apparatus. In FIG. 27, an image pickup element 1010 converts an optical image into an image signal, and an A/D (analog-to-digital) converter 1012 converts the analog output of the image pickup element 1010 into a digital signal. An image pickup signal processing circuit 1014 creates a brightness signal by performing color carrier elimination, aperture correction, a gamma process and the like to the output data of the A/D converter 1012, and simultaneously creates a color difference signal by performing color interpolation, matrix conversion, a gamma process, gain adjustment and the like to the output data of the A/D converter 1012, whereby image data of YUV format is created.

A memory I/F (interface) 1016 which includes writing and reading circuits 1016a and 1016b for a memory 1018, writes the image data from the image pickup signal processing circuit 1014 in the memory 1018, reads image data from the memory 1018, and outputs the read image data to a display system signal processing circuit 1020.

The display system signal processing circuit 1020 separates from the image data of YUV format a brightness component Y and a modified color difference component, i.e., a modified chroma component signal C, and then outputs them respectively to D/A (digital-to-analog) converters 1022Y and 1022C. The D/A converter 1022Y converts the brightness data from the display system signal processing circuit 1020 into an analog signal, and an LPF (low-pass filter) 1024Y eliminates a high-frequency noise component from the output of the D/A converter 1022Y. The output signal from the LPF 1024Y is transferred to a mixture circuit 1026 and an LCD (liquid crystal display) control circuit 1028. The D/A converter 1022C converts the modified chroma data from the display system signal processing circuit 1020 into an analog signal, and a BPF (band-pass filter) 1024C extracts only a frequency component of a modified chroma component from the output of the D/A converter 1022C. The output signal from the BPF 1024C is transferred to the mixture circuit 1026 and the LCD control circuit 1028.

The mixture circuit 1026 adds the brightness signal from the LPF 1024Y and the modified chroma signal from the BPF 1024C together to create a composite video signal. A video amplifier 1030 amplifies the composite video signal output from the mixture circuit 1026, and transfers the amplified signal to a TV monitor 1032, whereby the image obtained by the image pickup element 1010 is displayed on a screen of the TV monitor 1032.

The LCD control circuit 1028 converts the brightness signal Y from the LPF 1024Y and the modified chroma signal C from the BPF 1024C into an RGB signal composed of R (red), G (green) and B (blue) components, in accordance with a subcarrier frequency from a quartz oscillator 1034. The RGB signal is transferred to an LCD panel 1036 together with a driving pulse, whereby the image obtained by the image pickup element 1010 is displayed on a screen of the LCD panel 1036.

FIG. 28 is a block diagram showing a schematic structure of another conventional image pickup apparatus. In FIG. 28, operations of an image pickup element 1110, an A/D converter 1112, an image pickup signal processing circuit 1114, a memory I/F 1116, a writing circuit 1116a, a reading circuit 1116b and a memory 1118 are respectively the same of the operations of the image pickup element 1010, the A/D converter 1012, the image pickup signal processing circuit 1014, the memory I/F 1016, the writing circuit 1016a, the reading circuit 1016b and the memory 1018, respectively. Thus, a YUV-system image data is similarly transferred to a display-system signal processing circuit 1120.

The display-system signal processing circuit 1120 creates and outputs, from the YUV-system image data, a brightness signal Y, a composite video signal CV by adding the brightness component and a modified chroma signal C, a color difference signal U (=B−Y) by eliminating the brightness component from the B component, and a color difference signal V (=R−Y) by eliminating the brightness component from the R component.

A D/A converter 1122a converts the composite video data from the display-system signal processing circuit 1120 into an analog signal, and an LPF 1124a eliminates a high-frequency noise component from the output of the D/A converter 1122a. A video amplifier 1126 amplifies the output of the LPF 1124a and transfers the amplified signal to a TV monitor 1128.

D/A converters 1122b, 1122c and 1122d convert the brightness data Y, the color difference data U and the color difference data V from the display-system signal processing circuit 1120 into analog signals, respectively. LPF's 1124b, 1124c and 1124d eliminate high-frequency noise components from the outputs of the D/A converters 1122b, 1122c and 1122d, respectively. The outputs from the LPF's 1124b, 1124c and 1124d are transferred to an LCD control circuit 1130. It should be noted that each of the LPF's 1124c and 1124d ordinarily has a pass band of 1.5 MHz to 2.0 MHz.

The LCD control circuit 1130 creates an RGB signal from the brightness signal Y from the LPF 1124b, the color difference signal U from the LPF 1124c, and the color difference signal V from the LPF 1124d. The RGB signal is transferred to an LCD panel 1132 together with a driving pulse, whereby the image obtained by the image pickup element 1110 is displayed on a screen of the LCD panel 1132.

However, in the conventional image pickup apparatus shown in FIG. 27, since the RGB signal is created from the modified chroma signal C, the quartz oscillator 1034 generating subcarrier frequency is necessary, whereby the number of parts is increased. Further, in order to deal with plural different image signal systems, the circuit structure must be made different according to each image signal system.

As color television image signal systems, as well known, there are an NTSC (National Television System Committee) system adopted in Japan, United States and the like, and a PAL (Phase Alternation by Line color television) system adopted in European nations and the like. Since a carrier frequency of subcarrier is about 3.58 MHz in the NTSC system and about 4.43 MHz in the PAL system, the same crystal oscillator can not be used for the NTSC system and the PAL system. As a result, the circuit structure must be made different between these two image signal systems, whereby the number of parts is increased. Further, different adjustment is necessary for each of these different circuit structures, whereby production efficiency (mass productivity) decreases.

Further, in the conventional image pickup apparatus shown in FIG. 28, since the RGB signal is created from the brightness signal Y and the two color difference signals U and V, any quartz oscillator for generating subcarrier frequency is not necessary, whereby the number of parts can be decreased. Further, the structure of the LCD control circuit 1130 can be made the same irrespective of the image signal system. Therefore, this image pickup apparatus is excellent in the point of mass productivity as compared with the conventional image pickup apparatus shown in FIG. 27. Further, the image pickup apparatus shown in FIG. 28 can achieve high image quality.

However, in the conventional image pickup apparatus shown in FIG. 28, as described above, since the RGB signal is created from the brightness signal Y and the color difference signals U and V, the three D/A converters 1122b, 1122c and 1122d are necessary for the liquid crystal display operation. Further, in order to simultaneously display the image on the TV monitor and the LCD panel, the four kinds of signals CV, Y, U and V must be output in total, whereby the four D/A converters 1122a, 1122b, 1122c and 1122d are necessary in this case. When ASIC (application specific IC (integrated circuit)) is achieved with three or four D/A converters, there is a problem that the dimensions of circuits become large.

Further, if circuit miniaturization or downsizing due to the ASIC advances, since a power supply voltage of the ASIC core becomes lower, the circuit dimensions of the D/A converter to which a predetermined-level analog output is always necessary become relatively large. Thus, it is actually difficult to achieve ASIC's with many D/A converters.

SUMMARY OF THE INVENTION

The present invention has been made in consideration of the above problems, and an object thereof is to provide an image signal processing apparatus in which the number of circuit structures such as D/A converters and the like can be reduced.

In order to achieve the above object, one embodiment of the present invention adopts an image signal processing apparatus comprising:

a first resizing circuit for resizing input image data;

a first memory for storing the image data output from the first resizing circuit;

a second memory for temporarily storing the image data read from the first memory and being able to asynchronously perform data writing and data reading;

a processing circuit for performing a predetermined process to the image data read from the second memory; and a P/S (parallel-to-serial) conversion circuit for converting the image data from the processing circuit into serial signals of which the number is smaller than the number of bits of the image data from the processing circuit.

Further, according to another viewpoint, the present invention adopts an image signal processing apparatus comprising:

a first resizing circuit for resizing input image data;

a first memory for storing the image data output from the first resizing circuit;

a second memory for temporarily storing the image data read from the first memory and being able to asynchronously perform data writing and data reading;

a TV signal processing circuit for performing a predetermined signal process to the image data read from the second memory to generate a TV image signal;

an LPF (low-pass filter) for performing an LPF process to the image data read from the second memory; and a data conversion circuit for converting the image data from the LPF into image data of predetermined image display format.

Further, according to still another viewpoint, the present invention adopts an image signal processing apparatus comprising:

a first resizing circuit for resizing input image data;

a first memory for storing the image data output from the first resizing circuit;

a TV signal processing circuit for performing a predetermined signal process to the image data read from the first memory to generate a TV image signal;

a filter for performing a filtering process to the image data read from the first memory;

a data conversion circuit for converting the image data from the filter into image data of RGB data format;

a dot sequential conversion circuit for converting the RGB image data into an RGB dot sequential signal; and a second resizing circuit for resizing the RGB dot sequential signal from the dot sequential conversion circuit.

Still further, according to another aspect of the present invention, an image processing apparatus includes an image capture unit, a resizing unit, a memory unit, a first conversion unit and a second conversion unit. The image capture unit is adapted to capture an image. The resizing unit is adapted to resize the captured image and output a resized image. The memory unit is adapted to store the resized image. The first conversion unit is adapted to convert the resized image stored in the memory unit into an RGM image. The second conversion unit is adapted to convert the RGB image output from the first conversion unit into a plurality of serial data. The second conversion unit is adapted to convert the RGB image into two or four serial data.

Further, according to another aspect of the present invention, an image processing apparatus includes an image capture unit, a resizing unit, a memory unit, a first conversion unit and a second conversion unit. The image capture unit is adapted to capture an image. The resizing unit is adapted to resize the captured image and output a resized image. The memory unit is adapted to store the resized image. The first conversion unit is adapted to convert the resized image stored in the memory unit into an RGB image. The second conversion unit is adapted to convert the RGB image output from the first conversion unit into a plurality of serial data. The second conversion unit is adapted to convert the RGB image into dot sequential data before the RGB image is converted into the plurality of serial data.

In yet another aspect of the present invention, an image processing apparatus for processing an inputted image includes a first resizing unit, a memory unit, a second resizing unit, a first conversion unit, a second conversion unit and a third conversion unit. The first resizing unit is adapted to resize the inputted image and output a resized image. The memory unit is adapted to store the resized image. The second resizing unit is adapted to further resize the resized image stored in the memory unit and output a further resized image. The first conversion unit is adapted to convert the further resized image into an RGB image. The second conversion unit is adapted to convert the RGB image into a plurality of serial data. The third conversion unit is adapted to convert the resized image stored in the memory unit into an image for a TV monitor.

Still further, according to yet another aspect of the present invention, an image processing apparatus includes an image capture unit, a resizing unit, a memory unit, a first conversion unit and a second conversion unit. The image capture unit is adapted to capture an image. The resizing unit is adapted to resize the captured image and output a resized image. The memory unit is adapted to store the resized image. The first conversion unit is adapted to convert the resized image stored in the memory unit into an image for a TV monitor. The second conversion unit is adapted to convert the image for the TV monitor output from the first conversion unit into a plurality of serial data. The second conversion unit is adapted to convert image for the TV monitor into two or four serial data.

Further, according to yet another aspect of the present invention, an image processing apparatus includes an image capture unit, a first resizing unit, a memory unit, a first conversion unit, a second resizing unit and a second conversion unit. The image capture unit is adapted to capture an image. The first resizing unit is adapted to resize the captured image and output a resized image. The memory unit is adapted to store the resized image. The first conversion unit is adapted to convert the resized image stored in the memory unit into an RGB image. The second resizing unit is adapted to resize the RGB image and output the resized RGB image serially. The second conversion unit is adapted to convert the RGB image into dot sequential data before the RGB image is resized by the second resizing unit.

According to a still further aspect of the present invention, an image processing apparatus for processing an inputted image includes a resizing unit, a memory unit, a first conversion unit and a second conversion unit. The resizing unit is adapted to resize the inputted image and output a resized image. The memory unit is adapted to store the resized image. The first conversion unit is adapted to convert the resized image stored in the memory unit into an RGB image. The second conversion unit is adapted to convert the RGB image output from the first conversion unit into a plurality of serial data. The second conversion unit is adapted to convert the RGB image into two or four serial data.

Further, according to yet another aspect of the present invention, an image processing apparatus for processing an inputted image includes a resizing unit, a memory unit, a first conversion unit and a second conversion unit. The resizing unit is adapted to resize the inputted image and output a resized image. The memory unit is adapted to store the resized image. The first conversion unit is adapted to convert the resized image stored in the memory unit into an RGB image. The second conversion unit is adapted to convert the RGB image output from the first conversion unit into a plurality of serial data. The second conversion unit is adapted to convert the RGB image into dot sequential data before the RGB image is converted into the plurality of serial data.

In yet another aspect of the present invention, an image processing apparatus for processing an inputted image includes a resizing unit, a memory unit, a first conversion unit and a second conversion unit. The resizing unit is adapted to resize the inputted image and output a resized image. The memory unit is adapted to store the resized image. The first conversion unit is adapted to convert the resized image stored in the memory unit into an image for a TV monitor. The second conversion unit is adapted to convert the image for the TV monitor output from the first conversion unit into a plurality of serial data. The second conversion unit is adapted to convert the image for the TV monitor into two or four serial data.

Still further, according to another aspect of the present invention, an image processing apparatus for processing an inputted image includes a first resizing unit, a memory unit, a first conversion unit, a second resizing unit and a second conversion unit. The first resizing unit is adapted to resize the inputted image to provide a resized image. The memory unit is adapted to store the resized image. The first conversion unit is adapted to convert the resized image stored in the memory unit into an RGB image. The second resizing unit is adapted to resize the RGB image and output the resized RGB image serially. The second conversion unit is adapted to convert the RGB image into dot sequential data before the RGB image is resized by the second resizing unit.

Other objects and features of the present invention will be apparent from the following description and the attached drawings.

BRIEF DESCRIPTION OF THE DRAWINGS

FIG. 5 is a diagram showing image intervals and blanking intervals;

FIG. 6 is a diagram showing an example of parts E_RGB and S_RGB of data in the horizontal blanking interval;

DETAILED DESCRIPTION OF THE PREFERRED EMBODIMENTS

Hereinafter, the embodiments of the present invention will be explained in detail with reference to the attached drawings.

First Embodiment

Figure 1:
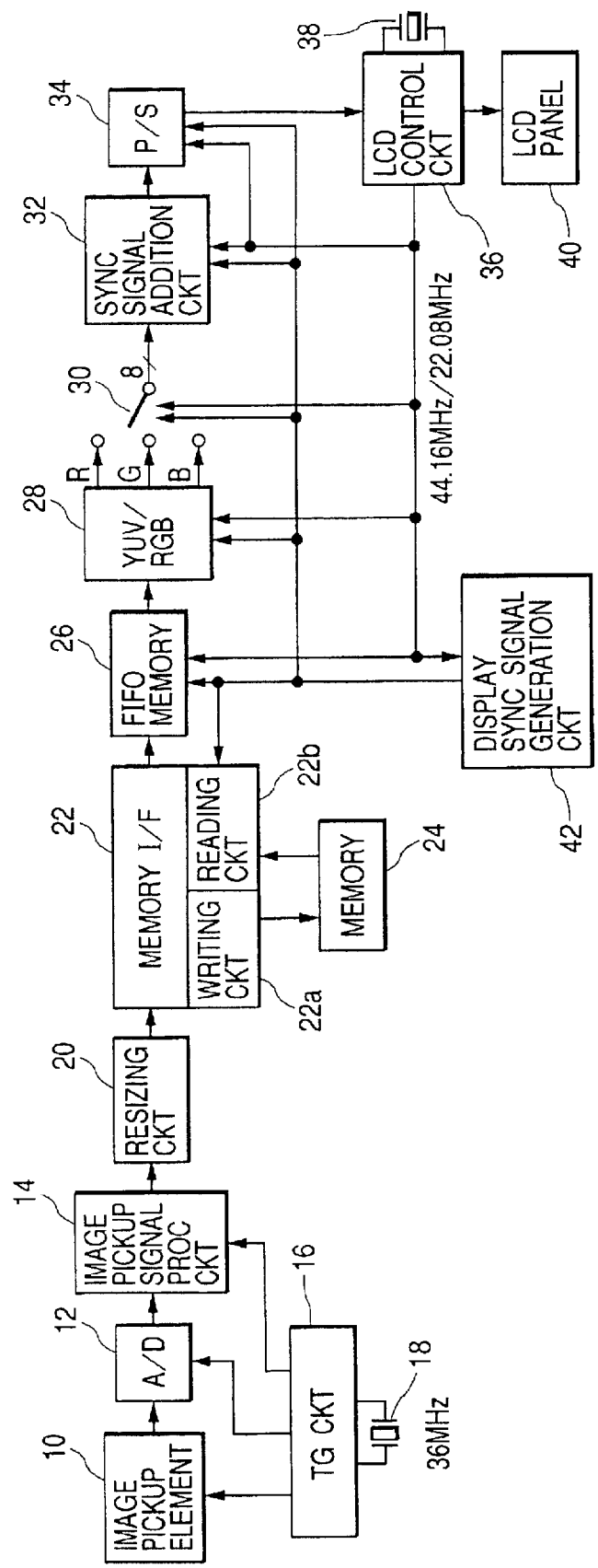
FIG. 1 is a block diagram showing a schematic structure of an image signal processing apparatus according to the first embodiment of the present invention.

FIG. 1 is a block diagram showing a schematic structure of an image signal processing apparatus according to the first embodiment of the present invention. In FIG. 1, numeral 10 denotes an image pickup element which converts an optical image into an electrical signal, and numeral 12 denotes an A/D converter which converts the analog image signal from the image pickup element 10 into a digital signal. Numeral 14 denotes an image pickup signal processing circuit which creates a brightness signal by performing color carrier elimination, aperture correction, a gamma process and the like to the output data of the A/D converter 12, and simultaneously creates a color difference signal by performing color interpolation, matrix conversion, a gamma process, gain adjustment and the like to the output data of the A/D converter 12, so as to create image data of YUV format. Numeral 16 denotes a TG (timing generation) circuit which generates clocks and timing signals necessary for the image pickup element 10, the A/D converter 12 and the image pickup signal processing circuit 14, in accordance with the output of a quartz oscillator (of which oscillation frequency is, e.g., 36 MHz) 18. Then, the TG circuit 16 supplies the generated clocks and timing signals to the image pickup element 10, the A/D converter 12 and the image pickup signal processing circuit 14.

Numeral 20 denotes a resizing circuit which resizes the image data transferred from the image pickup signal processing circuit 14, into the image data corresponding to a display size. Numeral 22 denotes a memory I/F which includes a writing circuit 22a and a reading circuit 22b for a memory (DRAM (dynamic random access memory)) 24. The memory I/F 22 writes the image data from the resizing circuit 20 in the memory 24, and reads image data stored in the memory 24. It should be noted that a memory space (i.e., a VRAM (video random access memory)) for the image display has been allocated on the memory 24.

There are two kinds of image data storage formats on the VRAM, i.e., the format of Y:U:V=4:2:2, and the format of Y:U:V=4:1:1. If it is assumed that the brightness signal Y and the color difference signals U and V are respectively eight-bit data, when Y:U:V=4:2:2, the data is stored in the VRAM in such a manner as upper byte data=Y0Y1Y2Y3Y4Y5Y6Y7 . . .

lower byte data=U0V0U2V2U4V4U6V6 . . .

On the other hand, when Y:U:V=4:1:1, the data is stored in the VRAM in such a manner as upper byte data=Y0Y1Y3Y4Y5Y7 . . .

lower byte data=U0V0Y2U4V4Y6 . . .

A data quantity of Y:U:V=4:1:1 is ¾ of a data quantity of Y:U:V=4:2:2. In the image display bands of the TV monitor and the LCD panel, it is enough in the data quantity of Y:U:V=4:1:1. Therefore, the VRAM which is optimum in the viewpoints of memory capacity and data transfer efficiency only has to be able to correspond to the storage format of Y:U:V=4:1:1. However, in the storage format of Y:U:V=4:2:2, since the brightness component Y and the color difference components U and V are being separated as the upper data and the lower data respectively, these components can be easily managed. Although both of the data formats are acceptable in the present embodiment, the data format in this case is assumed to be Y:U:V=4:2:2 for convenience' sake.

In the present embodiment, if it is assumed that the image pickup element 10 corresponds to 2,000,000 pixels, a quantity of output data of a screen of the image pickup signal processing circuit 14 corresponds to 1600 horizontal pixels and 1200 vertical pixels. The resizing circuit 20 resizes the output data of the image pickup signal processing circuit 14 into the data suitable for display and stores it in the VRAM of the memory 24. For example, in a case where the display area of the LCD panel is 521 horizontal (H) dots and 218 vertical (V) dots, the size of the VRAM is set to be suitable for the size of this display area, and the output screen size by the resizing circuit 20 is set to be 521 horizontal pixels and 218 vertical lines. When an LCD panel of which the number of dots is different from the above is used, the output size setting of the resizing circuit 20 is changed according to this number.

It is possible to add two pixels to the pixels in the vertical direction and perform data reading from the added-up pixels, according to a kind of image pickup element. In this case, since the vertical 600 pixels are read, sensitivity and a frame rate can be improved. Ordinarily, since the vertical size of the VRAM corresponds to 300 lines or less, the vertical four pixels are added or the two-pixel addition/two-pixel subtraction is performed when the data is read from the image pickup element, a frame rate for reading the image pickup element is further increased.

Numeral 26 denotes an FIFO memory for buffer which is used to change the rate of the image data output from the memory I/F 22 into a different data rate. Although the details are described later, a data string of 18 MHz from the memory I/F 22 is converted into a data string of 11.04 MHz by the FIFO memory 26.

Numeral 28 denotes a YUV/RGB converter which performs matrix conversion to the image data of YUV format from the FIFO memory 26 to generate image data of RGB format, numeral 30 denotes a dot sequential converter which converts the parallel R, G and B outputs from the YUV/RGB converter 28 into data of RGB dot sequential format, numeral 32 denotes a sync signal addition circuit which adds a sync signal to the RGB dot sequential signal output from the dot sequential converter 30, and numeral 34 denotes a P/S converter which converts the eight-bit parallel RGB dot sequential signal added with the sync signal of the sync signal addition circuit 32 into a serial signal of one to four bits.

Numeral 36 denotes an LCD control circuit which parallelizes the image data from the P/S converter 34 according to a clock form an oscillator 38, and transfers the obtained parallel data to an LCD panel 40 for image display. Numeral 42 denotes a display sync signal generation circuit which generates a display sync signal according to a clock of 44.16 MHz or 22.08 MHz from the LCD control circuit 36. The clocks of 44.16 MHz or 22.08 MHz output from the LCD control circuit 36 are transferred to the FIFO memory 26, the YUV/RGB converter 28, the dot sequential converter 30, the sync signal addition circuit 32, the P/S converter 34 and the display sync signal generation circuit 42. The sync signals generated by the display sync signal generation circuit 42 are transferred to the reading circuit 22b of the memory I/F 22, the FIFO memory 26, the YUV/RGB converter 28, the dot sequential converter 30, the sync signal addition circuit 32 and the P/S converter 34.

Figure 2:
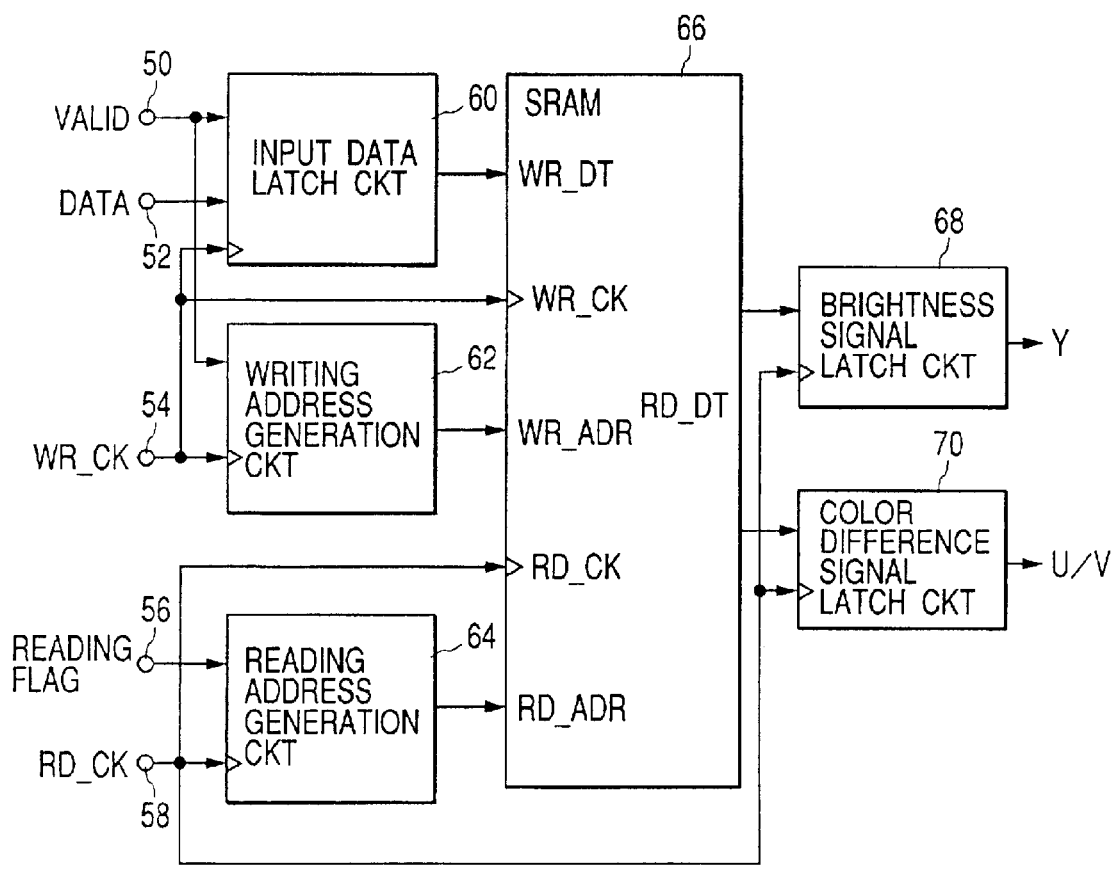
FIG. 2 is a block diagram showing a structural example of an FIFO (first-in, first-out) memory 26.

FIG. 2 shows a structural example of the FIFO memory 26. In FIG. 2, a flag VALID representing that the written data is valid is input from the memory I/F 22 to an input terminal 50, writing data DATA is input from the memory I/F 22 to an input terminal 52, a writing clock WR_CK is input to an input terminal 54, a read flag defining reading timing from the FIFO memory 26 is input to an input terminal 56, and a reading clock RD_CK is input to an input terminal 58.

The image data is input to the input terminal 52 when the flag VALID is "1", while the image data is not input to the input terminal 52 when the flag VALID is "0". The writing clock WR_CK is the clock of 18 MHz which is obtained by dividing 36 MHz output from the TG circuit 16 into two. The rate of the writing clock WR_CK does not necessarily conform with the rate of the flag VALID. Namely, the data writing rate to the FIFO memory 26 substantially conforms with the image data reading rate from the image pickup element 10, and the rate of the writing clock WR_CK is independent of the data writing rate to the FIFO memory 26.

An input data latch circuit 60 latches the data of the input terminal 52 when the flag VALID is "1". A writing address generation circuit 62 generates a writing address to be subjected to increment according to the writing clock WR_CK when the flag VALID is "1". A reading address generation circuit 64 generates a reading address to be subjected to increment according to the reading clock RD_CK when the flag VALID is "1".

Numeral 66 denotes an SRAM (static random access memory) which has data writing ports and data reading ports. Namely, the output data of the input data latch circuit 60 is input to a data writing port WR_DT, the writing clock WR_CK from the input terminal 54 is input to a writing clock port WR_CK, the output of the writing address generation circuit 62 is input to a writing address port WR_ADR, the reading clock RD_CK from the input terminal 58 is input to a reading clock port RD_CK, and the output of the reading address generation circuit 64 is input to a reading address port RD_AD. The SRAM 66 writes the data from the input data latch circuit 60 at the address indicated by the output of the writing address generation circuit 62, in accordance with the writing clock WR_CK.

Further, when the reading flag of the input terminal 56 is "1", the SRAM 66 reads the data at the address indicated by the output of the reading address generation circuit 64 and outputs it through a reading data output port RD_DT, in accordance with the reading clock RD_CK. Conversely, when the reading flag of the input terminal 56 is "0", the SRAM 66 does not read any data. Here, the reading flag changes at a rate equivalent to the dot clock of 11.04 MHz of the LCD panel 40, and the reading clock RD_CK is n times the dot clock of 11.04 MHz (n is 2 or 4). Therefore, the writing clock WR_CK is completely asynchronous with the reading clock RD_CK.

A brightness signal latch circuit 68 latches the brightness data in the output data of the SRAM 66 according to the reading clock RD_CK, and a color difference signal latch circuit 70 latches the color difference data in the output data of the SRAM 66 according to the reading clock RD_CK. The brightness signal latch circuit 68 and the color difference signal latch circuit 70 are structured such that the outputs thereof satisfy Y:U:V=4:2:2. When the VRAM on the memory 24 has the data format of Y:U:V=4:2:2, since the upper bytes of the output of the SRAM 66 are the brightness data (Y) while the lower bytes thereof are the color difference data (UV), the brightness data (Y) can be easily separated from the color difference data (UV) based on bit distribution of the output data, whereby the data format of Y:U:V=4:2:2 is obtained. If the VRAM on the memory 24 has the data format of Y:U:V=4:1:1, the brightness signal latch circuit 68 and the color difference signal latch circuit 70 are structured, such that the output of the SRAM 66 is read and classified for each address, and thus the data format of Y:U:V=4:1:1 is converted into the data format of Y:U:V=4:2:2. Namely, the brightness signal latch circuit 68 latches the brightness data existing in the upper and lower bytes of the output data of the SRAM 66 in accordance with the reading address, and the color difference signal latch circuit 70 latches the color difference data existing only in the lower bytes of the output data of the SRAM 66, whereby the data format of Y:U:V=4:2:2 can be obtained.

By the structure of the FIFO memory 26 as shown in FIG. 2, the data rate of 18 MHz obtained by dividing the output clock of the TG circuit 16 into two is converted into the data rate of 11.04 MHz of the dot clock of the LCD panel 40.

Figure 3:
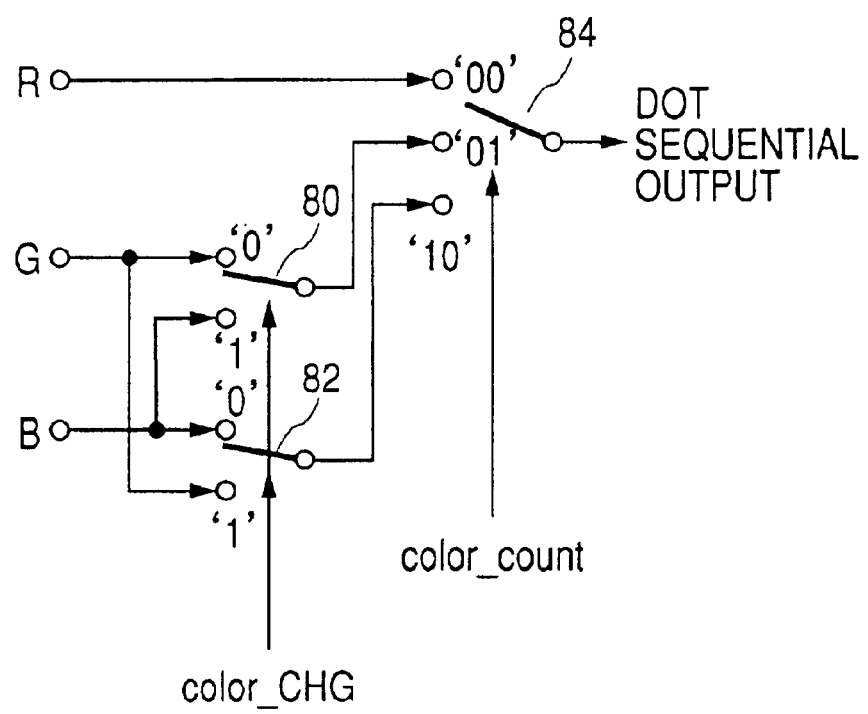
FIG. 3 is a block diagram showing a schematic structure of a dot sequential converter 30.
Figure 4A:
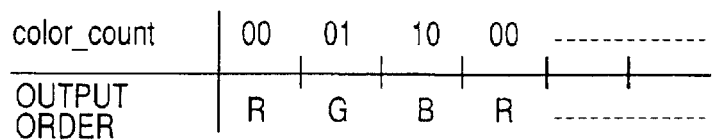
FIGS. 4A, 4B, 4C, 4D, 4E and 4F are operation timing charts of the dot sequential converter 30.
Figure 4B:
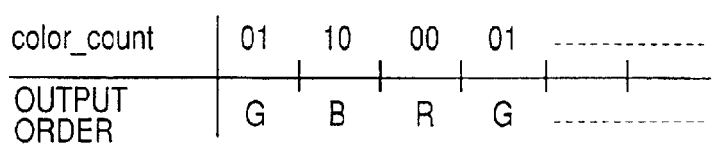
Figure 4C:
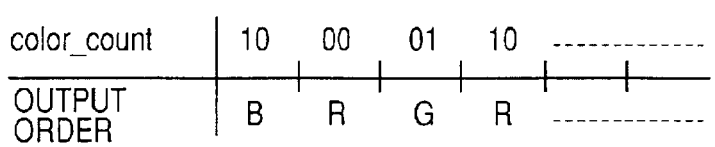
Figure 4D:
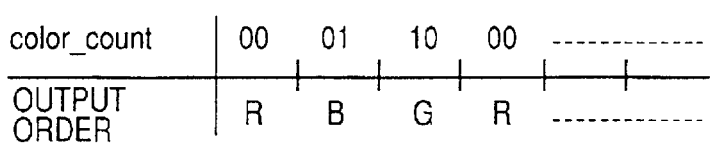
Figure 4E:
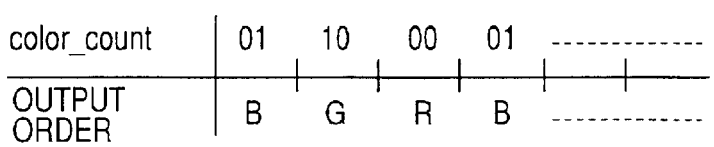
Figure 4F:
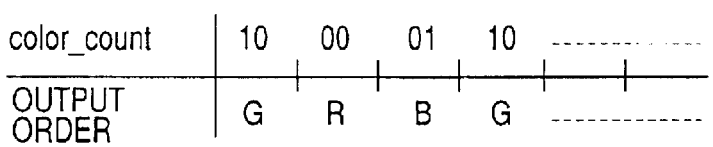

FIG. 3 is a block diagram showing a schematic structure of the dot sequential converter 30, and FIGS. 4A to 4F are operation timing charts of the dot sequential converter 30. In FIG. 3, a selector 80 selects the G data when a change control signal color_CHG is "0", and selects the B data when the change control signal color_CHG is "1". A selector 82 selects the B data when the change control signal color_CHG is "0", and selects the G data when the change control signal color_CHG is "1". A selector 84 selects any one of the R data, the output of the selector 80 and the output of the selector 82 in accordance with a change control signal color_count of which the rate is the same as the rate of the dot clock of the LCD panel 40.

The change control signal color_count is generated by an up-counter (not shown) circulating among three values "00", "01" and "10" at the rate of the dot clock of the LCD panel 40. By arbitrarily changing the initial value of this up-counter for each line, a set of modes #0 to #2 and a set of modes #3 to #5 can be changed to each other as shown in FIGS. 4A to 4F. It is possible by the change control signal color CHG which of the G data and the B data it is necessary to process first. As a result, as shown in FIGS. 4A to 4E, the following six kinds of conversion modes can be selected.

mode #0: R,G,B,R,G,B, . . .
mode #1: G,B,R,G,B,R, . . .
mode #2: B,R,G,B,R,G, . . .
mode #3: R,B,G,R,B,G, . . .
mode #4: B,G,R,B,G,R, . . .
mode #5: G,R,B,G,R,B, . . .

Next, an operation of the sync signal addition circuit 32 will be explained with reference to FIGS. 5 and 6. FIG. 5 is a diagram showing image intervals and blanking intervals, and FIG. 6 is a diagram showing an example of parts E_RGB and S_RGB of data in the horizontal blanking interval.

In FIG. 5, a plan view 86 shows the relation of images displayed on the LCD panel 40 and undisplayed blanking parts. In the plan view 86, the vertical blanking intervals exist in the upper and center parts, and the horizontal blanking interval exists in the left side. The RGB data displayed as the image is within the range of the horizontal 521 pixels and the vertical 218 lines. Numeral 88 denotes timing of the first line in case of paying attention to the horizontal direction. In the timing 88, the part E_RGB indicates the end of the RGB data, and the part S_RGB indicates the start of the RGB data. FIG. 6 shows data structures and data examples of the parts E_RGB and S_RGB. In this case, it is judged whether or not the target is the blanking interval, by using data "FFh" and "00h" as a marker. Therefore, the data "FFh" and "00h" have been preprocessed such that they do not exist in the RGB data part.

Concretely, in FIG. 6, the data "00h" is repeated two times (second and third words) after the data "FFh" (first word), and such data structure is used as the marker. In next data (fourth word), there are bits to judge whether the vertical blanking or the horizontal blanking is designated. When V=0, this data structure corresponds to the RGB data, and when V=1, this data structure corresponds to the vertical blanking. Further, H=1 indicates the start of the RGB data, and H=1 indicates the end of the RGB data. In the horizontal blanking interval, the parts other than the parts E_RGB and S_RGB are filled with data "03H".

Figure 7:
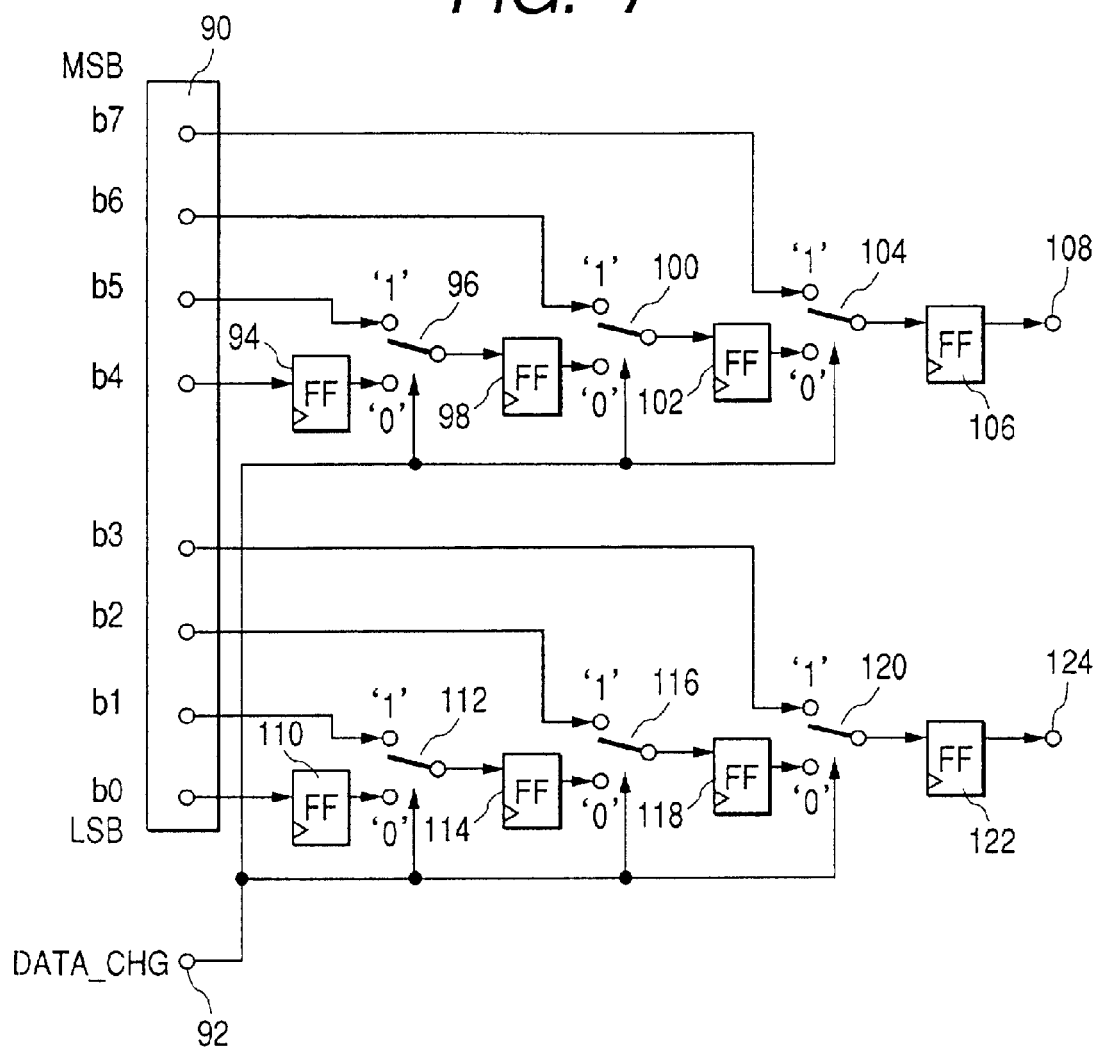
FIG. 7 is a block diagram showing a schematic structure of a P/S (parallel-to-serial) converter 34.
Figure 8:
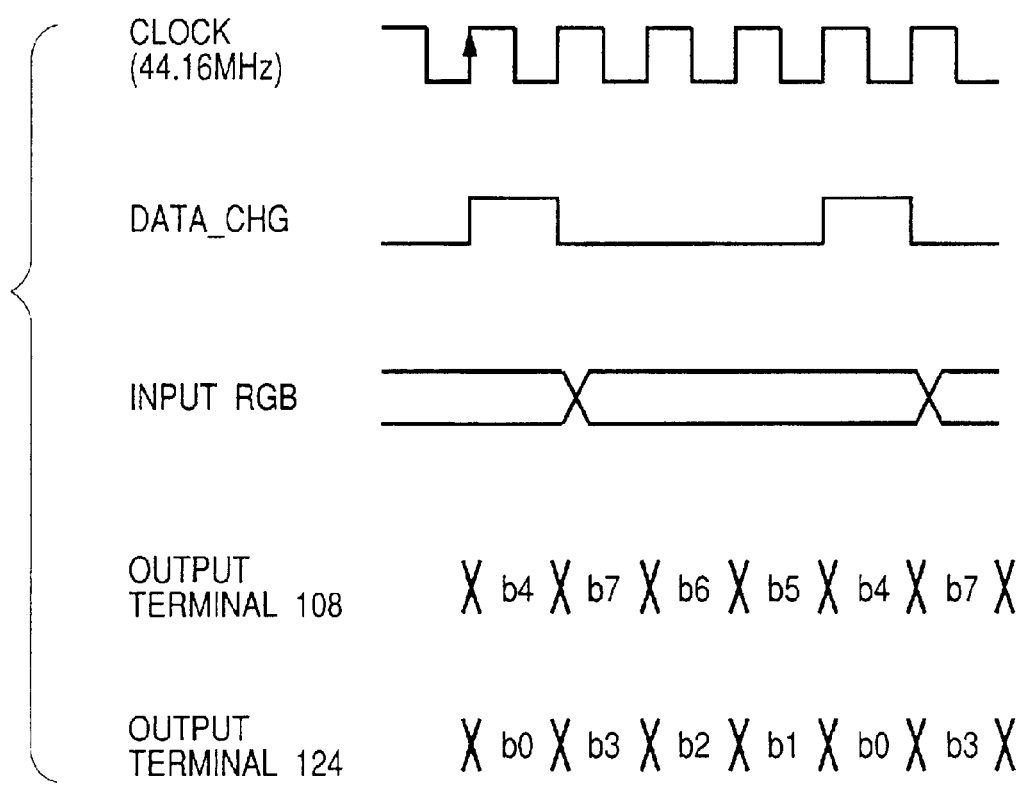
FIG. 8 is a timing chart of the P/S converter 34.

FIG. 7 is a block diagram showing a schematic structure of the P/S converter 34, and FIG. 8 is a timing chart of the P/S converter 34. An operation of the P/S converter 34 will be explained in detail with reference to FIGS. 7 and 8. Respective bits b0 to b7 of the eight-bit RGB dot sequential data are input in parallel to an input terminal 90, and a data change control signal DATA_CHG corresponding to the dot clock (11.04 MHz) of the LCD panel 40 is input to an input terminal 92. FF's (flip-flops) 94, 98, 102, 106, 110, 114, 118 and 122 are operated according to the clock (44.16 MHz) from the LCD control circuit 36. Selectors 96, 100, 104, 112, 116 and 120 are switched according to the data change control signal DATA_CHG. The data change control signal DATA_CHG is generated by setting one of four clocks (44.16 MHz) from the LCD control circuit 36 to be "1".

The output of the FF 106 is further output from an output terminal 108, and the output of the FF 122 is further output from an output terminal 124. In the structure of FIG. 7, the eight-bit parallel data are converted into two serial data, whereby the number of data lines to the LCD control circuit 36 is reduced. As shown in FIG. 8, the RGB dot sequential signal input at the rate of the dot clock (11.04 MHz) of the LCD panel 40 is latched by the FF's 94, 98, 102, 106, 110, 114, 118 and 122 together when the data change control signal DATA_CHG=1. In synchronism with the clock of 44.16 MHz, the bits b7, b6, b5 and b4 are sequentially output from the output terminal 108, and the bits b3, b2, b1 and b0 are sequentially output from the output terminal 124.

Figure 9:
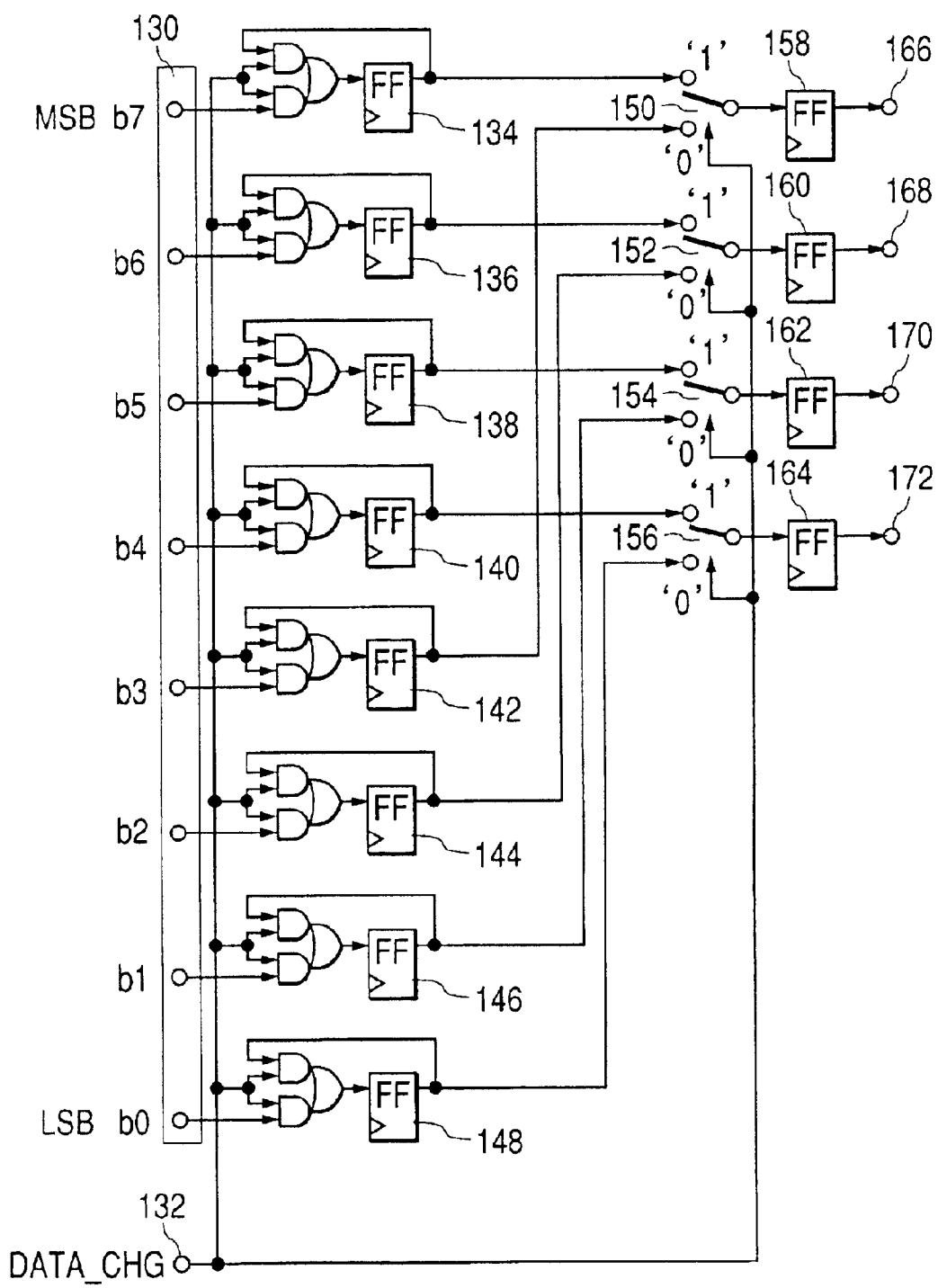
FIG. 9 is a block diagram showing the schematic structure of the P/S converter 34 in a case where eight-bit parallel data is converted into four serial signals.
Figure 10:
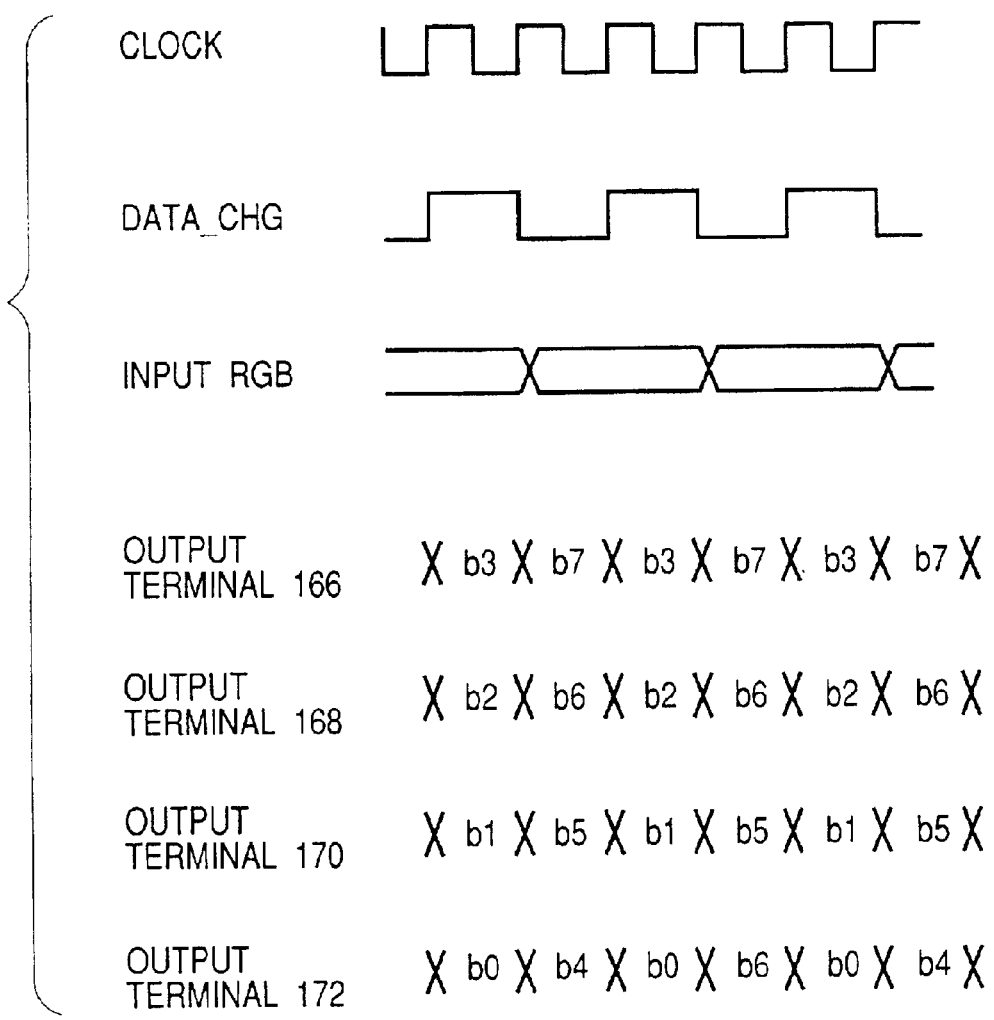
FIG. 10 is an operation timing chart for the structure shown in FIG. 9.

FIG. 9 is a block diagram showing the schematic structure of the P/S converter 34 in a case where the eight-bit parallel data is converted into four serial signals, and FIG. 10 is an operation timing chart for the P/S converter 34. Respective bits b0 to b7 of the eight-bit RGB dot sequential data are input in parallel to an input terminal 130, and the data change control signal DATA_CHG corresponding to the dot clock (11.04 MHz) of the LCD panel 40 is input to an input terminal 132.

FF's 134, 136, 138, 140, 142, 144, 146 and 148 which are operated according to the clock of 22.08 MHz from the LCD control circuit 36 respectively latch the bits b7, b6, b5, b4, b3, b2, b1 and b0 input to the input terminal 130, when the data change control signal DATA_CHG=1. Selectors 150, 152, 154 and 156 respectively select the outputs of the FF's 134, 136, 138 and 140 when the data change control signal DATA_CHG=1, and respectively select the outputs of the FF's 142, 144, 146 and 148 when the data change control signal DATA_CHG=0. FF's 158, 160, 162 and 164 which are operated according to the clock of 22.08 MHz from the LCD control circuit 36 respectively latch the data selected by the selectors 150, 152, 154 and 156, and then output the latched data to output terminals 166, 168, 170 and 172 respectively.

In the structure of FIG. 9, as shown in FIG. 10, the RGB dot sequential signal input at the rate of the dot clock (11.04 MHz) of the LCD panel 40 is latched by the FF's 134, 136, 138, 140, 142, 144, 146 and 148 together when the data change control signal DATA_CHG=1. In synchronism with the clock of 22.08 MHz, the bits b7 and b3 are alternately output from the output terminal 166, the bits b6 and b2 are alternately output from the output terminal 168, the bits b5 and b1 are alternately output from the output terminal 170, and the bits b4 and b0 are alternately output from the output terminal 172. Thus, the eight-bit parallel data is converted into the four serial data.

On the premise that ASIC is achieved with the P/S converter 34 and its previous circuits, it is important to reduce the number of signal lines from the P/S converter 34 to the LCD control circuit 36. It is efficient if the eight-bit parallel signal can be converted into one-bit serial signal. On the other hand, if the number of signal lines in the P/S converter 34 is made 1/n, it is necessary to operate the P/S converter 34 with the clock of which the frequency is n times as much as the clock from the LCD control circuit 36 (here, n=8 when the eight-bit parallel signal is converted into the one-bit serial signal, and the frequency at this time is 88.32 MHz). Thus, since clock speed increases, the entire size of the circuit increases, and also timing design becomes difficult. Therefore, it is necessary to optimally select the number of signal lines from the P/S converter 34 to the LCD control circuit 36.

Figure 11:
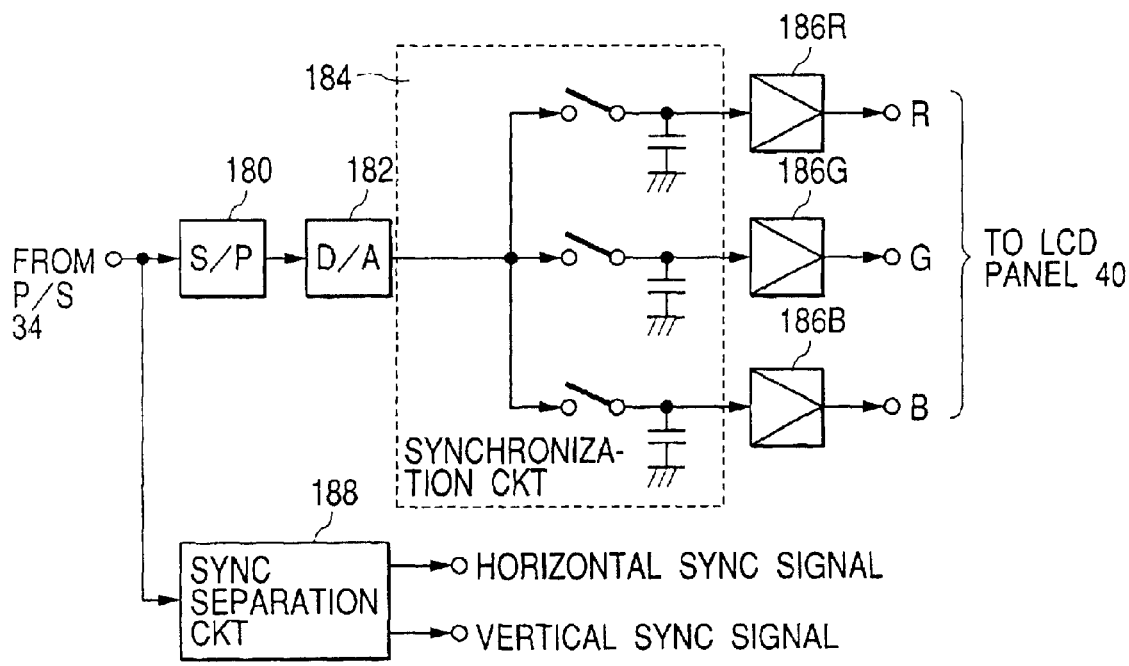
FIG. 11 is a block diagram showing a schematic structure of an LCD control circuit 36.

FIG. 11 is a block diagram showing a schematic structure of the LCD control circuit 36. An S/P converter 180 converts the serial RGB dot sequential signal from the P/S converter 34 into a parallel RGB signal, and a D/A converter 182 converts the output data from the S/P converter 180 into an analog signal. A synchronization circuit 184 separates the parallel RGB signal output from the D/A converter 182 into R, G and B components and synchronizes them. Buffer amplifiers 186R, 186G and 186B respectively adjust the levels of the R, G and B component data to the voltage level suitable for the LCD panel 40, and then transfer these data to the LCD panel 40. A sync separation circuit 183 separates horizontal and vertical sync signals from the serial data of the P/S converter 34, and transfers these signals to the LCD panel 40. Besides, the LCD control circuit 36 generates a driving pulse to drive an LCD element of the LCD panel 40, and transfers this pulse to the LCD panel 40.

Figure 12:
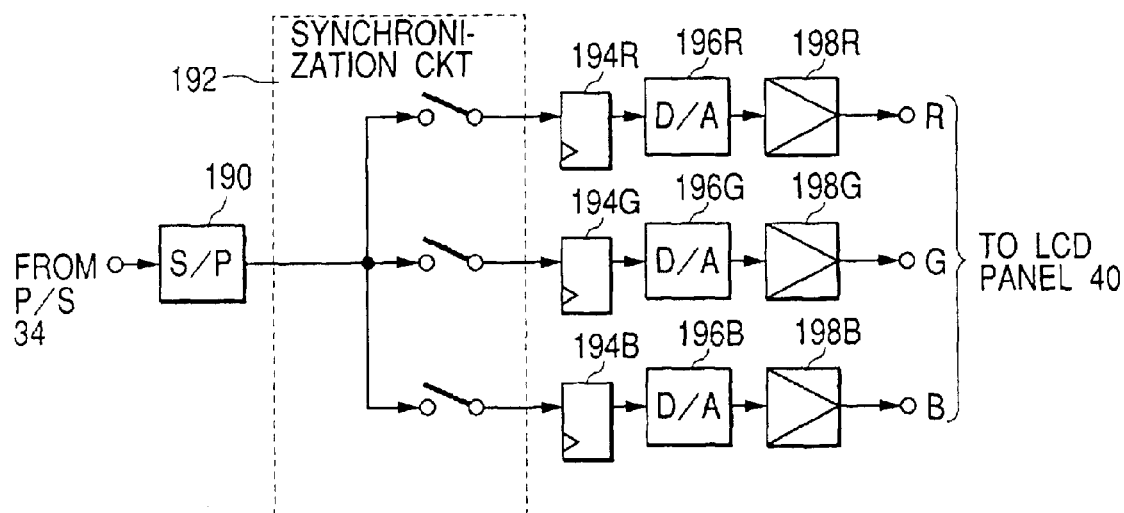
FIG. 12 is a block diagram showing another schematic structure of the LCD control circuit 36.

FIG. 12 is a block diagram showing another schematic structure of the LCD control circuit 36. An S/P converter 190 converts the serial RGB dot sequential signal from the P/S converter 34 into a parallel RGB signal, and a synchronization circuit 192 synchronizes the parallel RGB signal output from the S/P converter 190. Latch circuits 194R, 194G and 194B respectively latch R, G and B data from the synchronization circuit 192, and D/A converters 196R, 196G and 196B respectively convert the output data of the latch circuits 194R, 194G and 194B into analog signals. Buffer amplifiers 198R, 198G and 198B respectively adjust the levels of the R, G and B component data to the voltage level suitable for the LCD panel 40, and then transfer these data to the LCD panel 40.

In the structure of FIG. 11, since the number of D/A converters is small, the entire size of the circuit is relatively small. However, in this case, since high-speed synchronization for the analog signals is difficult, an excellent and satisfactory characteristic can not be easily obtained. Conversely, in the structure of FIG. 12, since the R, G and B signals are synchronized in digital form, a desired characteristic can be easily obtained, and the entire circuit structure can be made simple. However, since the three D/A converters are necessary in this case, the entire size of the circuit increases. Therefore, the optimum structure of the LCD control circuit 36 only has to be selected according to an environmental situation.

Figure 13:
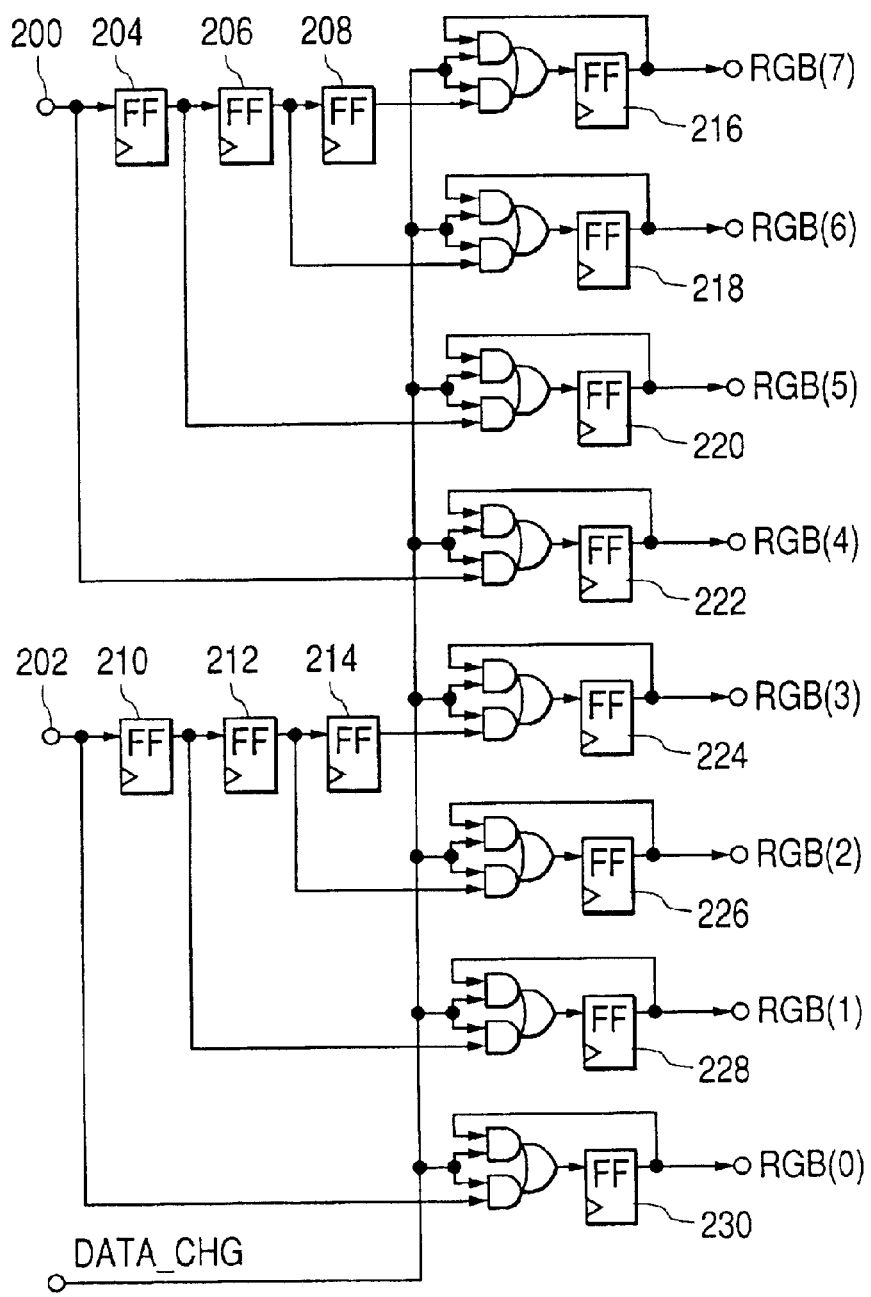
FIG. 13 is a block diagram showing a schematic structure of S/P (serial-to-parallel) converters 180 and 190.
Figure 14:
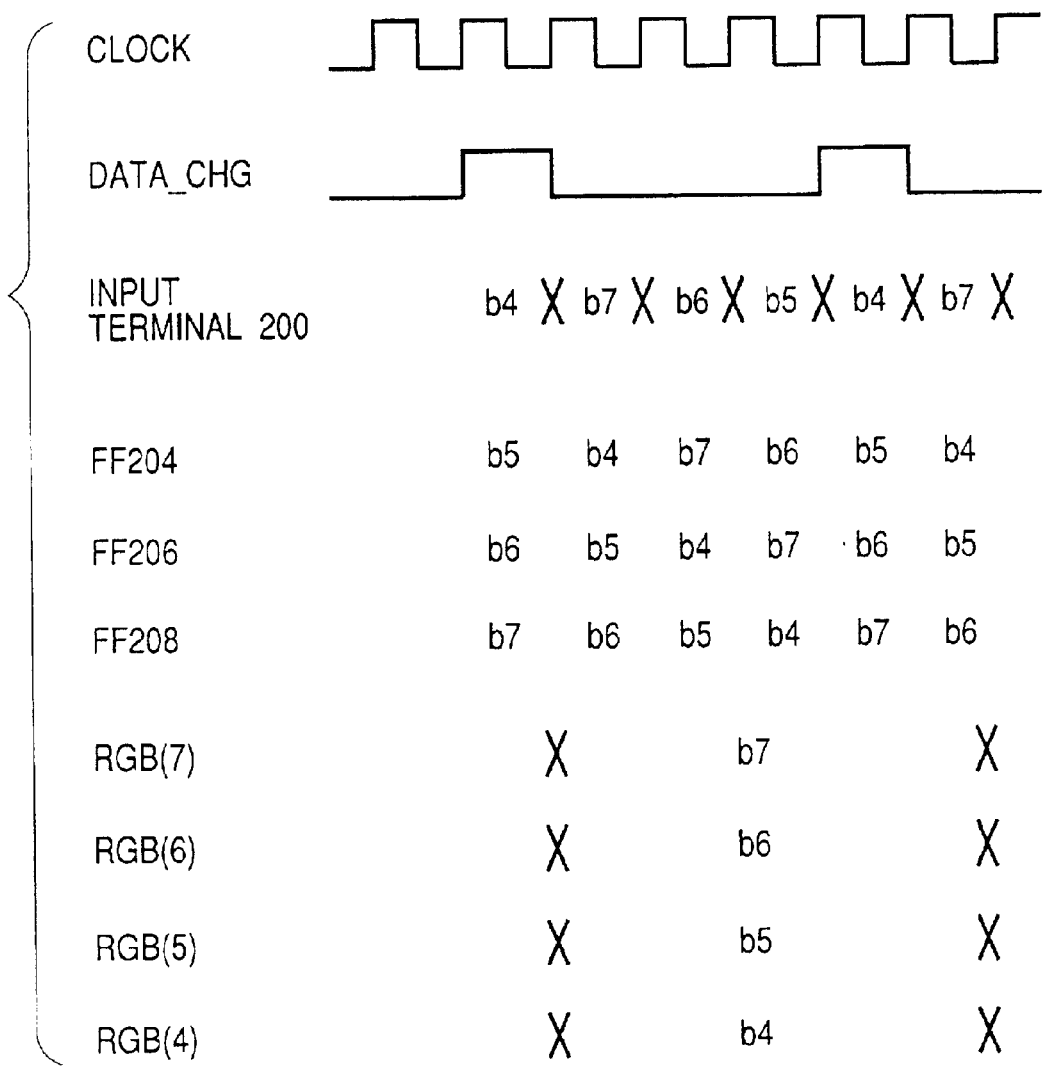
FIG. 14 is an operation timing chart for the structure shown in FIG. 13.

FIG. 13 is a block diagram showing a schematic structure of the S/P converters 180 and 190. FIG. 13 shows a structural example that two serial signals are converted into eight-bit parallel signals, and is opposite to FIG. 7. Basically, the structure of FIG. 13 achieves the conversion which is opposite to the P/S conversion shown in FIG. 7. FIG. 14 is an operation timing chart for the structure of FIG. 13.

The data is input to input terminals 200 and 202 at the dot clock rate (11.04 MHz) of the LCD panel 40. The input data of the input terminal 200 is then input to a shift register composed of serially connected FF's 204, 206 and 208, and the input data of the input terminal 202 is then input to a shift register composed of serially connected FF's 210, 212 and 214.

As shown in FIG. 14, gate-added FF's 216, 218, 220 and 222 together latch the outputs of the FF's 208, 206 and 204 and the data of the input terminal 200 respectively, when the data change control signal DATA_CHG=1. The outputs of the FF's 216, 218, 220 and 222 are managed as the bits b7, b6, b5 and b4 of the eight-bit parallel signals. Similarly, gate-added FF's 224, 226, 228 and 230 together latch the outputs of the FF's 214, 212 and 220 and the data of the input terminal 220 respectively, when the data change control signal DATA_CHG=1. The outputs of the FF's 224, 226, 228 and 230 are managed as the bits b3, b2, b1 and b0 of the eight-bit parallel signals.

In the structure of FIG. 13, the serial signal is converted into the parallel signals at the timing of the signal DATA_CHG. Besides, it is possible to decode the input serial signal, judge the part E_RGB or S_RGB in the horizontal blanking of the input signal, reset a four-bit counter at such timing, and create the signal corresponding to the signal DATA_CHG. Namely, even if the signal DATA_CHG is not externally input, the same S/P conversion as above can be achieved.

For example, when the dot clock of the LCD panel 40 has the frequency of 11.04 MHz and the P/S converter 34 has the two serial outputs, the oscillator 38 performs oscillation at 44.16 MHz (=11.04 MHz×4). When the P/S converter 34 has the four serial outputs, the oscillator 38 performs oscillation at 22.08 MHz (=11.04 MHz×2).

The display sync signal generation circuit 42 generates and supplies various timing signals, e.g., a data reading timing signal for the FIFO memory 26, and timing signals of the dot clocks for the YUV/RGB converter 28, the dot sequential converter 30, the sync signal addition circuit 32 and the P/S converter 34, in accordance with the clock (11.04 MHz×4=44.16 MHz) from the LCD control circuit 36.

In order to correctly perform the image display on the LCD panel 40 without any disturbance of the image data stored in the VRAM of the memory 24, it is necessary to create, after changing the data rate in the FIFO memory 26, the RGB serial dot sequential signal on the basis of the dot clock from the LCD control circuit 36.

Next, the operation in the present embodiment shown in FIG. 1 will be explained. The A/D converter 12 converts the output signals of the image pickup element 10 into the digital signal and then transfers it to the image pickup signal processing circuit 14. The image pickup signal processing circuit 14 creates brightness data Y by performing color carrier elimination, aperture correction, a gamma process and the like to the input image data, and creates color difference data U (=B−Y) and V (=R−Y) by performing color interpolation, matrix conversion, a gamma process and the like to the input image data. According to a storage format of Y:U:V=4:2:2, the output data from the image pickup signal processing circuit 14 is input to the resizing circuit 20 with horizontal 1600 pixels and vertical 300 pixels from the upper left on the screen in due order in such a manner as upper byte data=Y0Y1Y2Y3Y4Y5Y6Y7 . . .
lower byte data=U0V0U2V2U4V4U6V6 . . .

In this case, electric charge signals of the image pickup element 10 are read in two-pixel addition/two-pixel subtraction along the vertical direction.

The resizing circuit 20 resizes the brightness and color difference data from the image pickup signal processing circuit 14 into the data of which the size corresponds to that of the VRAM of horizonal 521 pixels and vertical 218 lines, and writes the resized data in the memory 24 through the memory I/F 22. The memory I/F 22 reads the VRAM data on the memory 24 at the display timing of the LCD panel 40 which is completely asynchronous with the VRAM writing timing, and inputs the read data in the FIFO memory 25. In the data reading from the VRAM, the data in the area of which the size is the same as the VRAM size in case of the data writing is read.

When the data is written in the memory 24, the operation clocks of the resizing circuit 20, the memory I/F 22 and the memory 24 are synchronous with the output of 36 MHz from the oscillator 18 of the TG circuit 16, but these clocks may be asynchronous with such the output. Namely, when the operation clocks of the resizing circuit 20, the memory I/F 22 and the memory 24 are asynchronous with the output from the oscillator 18 of the TG circuit 16, a circuit for asynchronously transferring its output data to the resizing circuit 20 may be disposed at the output stage of the image pickup signal processing circuit 14. Even in such a case, since the average VRAM writing rate is equal to the data reading rate from the image pickup element 10, this average rate is completely asynchronous with the display rate of the LCD panel 40.

As described above, in the FIFO memory 26, the data reading can be performed in asynchronism with the data writing. In the present embodiment, the data writing to the FIFO memory 26 is performed at the frequency 18 MHz obtained by dividing the output frequency 36 MHz of the oscillator 18, while the data reading therefrom is performed according to the clock of 22.08 MHz from the LCD control circuit 36. Thus, the driving clock for the image pickup element 10 can be determined without depending on the dot clock of the LCD panel 40. Conversely, the dot clock of the LCD panel 40 can be arbitrarily selected without depending on the driving clock of the image pickup element 10, the performance of the apparatus can be freely set at the system design.

The display sync signal generation circuit 42 generates the various timing signals according to the clock from the LCD control circuit 36, and transfers the timing signals to the FIFO memory 26, the YUV/RGB converter 28, the dot sequential converter 30, the sync signal addition circuit 32 and the P/S converter 34.

The YUV/RGB converter 28 converts the image data of Y:U:V=4:2:2 format read from the FIFO memory 26 into the image data of RGB format according to following expressions.

$$R=V+Y=R-Y+Y$$

$$B=U+Y=B-Y+Y$$

$$G=1.6949 \times Y-(0.5085 \times R+0.1864 \times B)$$

The dot sequential converter 30 converts the R, G and B data from the YUV/RGB converter 28 into the RGB dot sequential signal. At this time, the order of R, G and B components on the dot sequential signal must be matched with the synchronization order of the synchronization circuit 184 or 192 in the LCD control circuit 36. Therefore, in the present embodiment, as shown in FIGS. 4A to 4F, the order of the R, G and B components in the dot sequential signal can be arbitrarily selected from among six kinds of modes, i.e., modes #0 to #5. Namely, when the synchronization circuit 184 or 192 in the LCD control circuit 36 synchronize the dot sequential signal in the order of R, G and B components, the dot sequential converter 30 is controlled to dot-synchronize the RGB data in the mode #0.

The sync signal addition circuit 32 adds or embeds a blanking code and a sync signal code in the blanking interval of the RGB dot sequential signal output from the dot sequential converter 30. At the same time, the sync signal addition circuit 32 performs limiting such that the image data does not include the data values "FFh" and "00h". The P/S converter 34 converts the eight-bit parallel data from the sync signal addition circuit 32 into the two or four serial data.

The LCD control circuit 36 converts the two or four serial data from the P/S converter 34 into the eight-bit parallel data, converts the obtained parallel data into the analog signals, synchronizes the R, G and B signals, adjusts the voltage levels of these signals, and transfers these signals to the LCD panel 40 together with the driving pulse. Thus, an optical image incident on the image pickup element 10 is displayed as a visible image on the screen of the LCD panel 40. Thus, the parallel image data is D/A converted into the serial signals of which the bit number is smaller than that of the parallel image data (e.g., 24-bit parallel data is converted into R, G and B serial signals each having eight bits), whereby the number of D/A converters can be reduced, and thus the entire size of the circuit can be decreased.

Second Embodiment

Figure 15:
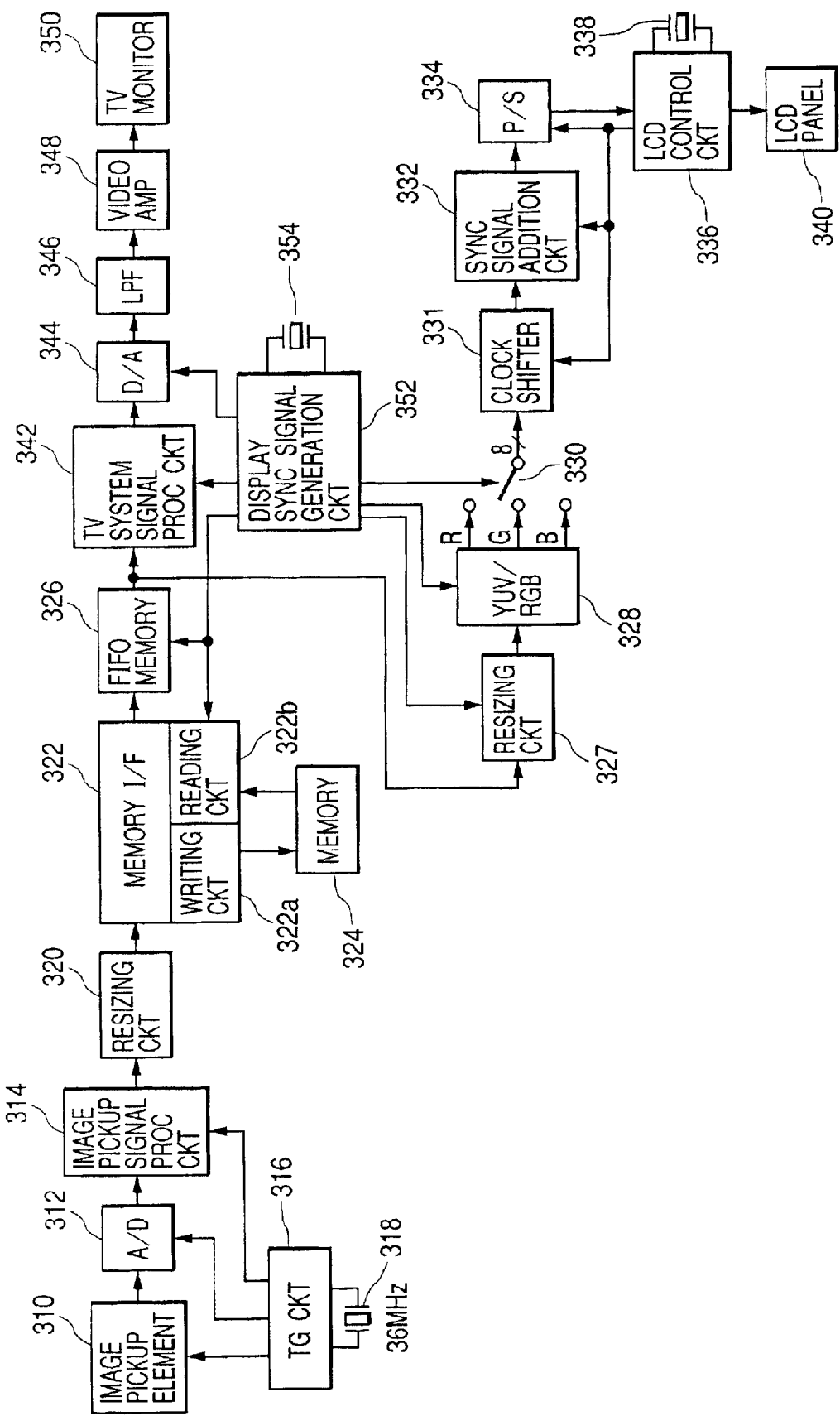
FIG. 15 is a block diagram showing a schematic structure of an image signal processing apparatus according to the second embodiment of the present invention.

FIG. 15 is a block diagram showing a schematic structure of an image signal processing apparatus according to the second embodiment of the present invention. In the present embodiment, an optical image incident on an image pickup element can be simultaneously displayed on both an LCD panel and a TV monitor.

In FIG. 15, numeral 310 denotes an image pickup element which converts the optical image into an electrical signal, and numeral 312 denotes an A/D converter which converts the analog image signal from the image pickup element 310 into a digital signal. Numeral 314 denotes an image pickup signal processing circuit which creates a brightness signal by performing color carrier elimination, aperture correction, a gamma process and the like to the output data of the A/D converter 312, and simultaneously creates a color difference signal by performing color interpolation, matrix conversion, a gamma process, gain adjustment and the like to the output data of the A/D converter 312, so as to create image data of YUV format. Numeral 316 denotes a TG circuit which generates clocks and timing signals necessary for the image pickup element 310, the A/D converter 312 and the image pickup signal processing circuit 314, in accordance with the output of a quartz oscillator (of which oscillation frequency is, e.g., 36 MHz) 318. Then, the TG circuit 316 supplies the generated clocks and timing signals to the image pickup element 310, the A/D converter 312 and the image pickup signal processing circuit 314.

Numeral 320 denotes a resizing circuit which resizes the image data transferred from the image pickup signal processing circuit 314, into the image data corresponding to a display size (about 720×480 pixels in an NTSC system). Numeral 322 denotes a memory I/F which includes a writing circuit 322a and a reading circuit 322b for a memory (DRAM) 324. The memory I/F 322 writes the image data from the resizing circuit 320 in the memory 324, and reads image data stored in the memory 324. It should be noted that a memory space (i.e., a VRAM) for the image display has been allocated on the memory 324. As well as the case of the first embodiment, there are two kinds of image data storage formats on the VRAM, i.e., the format of Y:U:V=4:2:2, and the format of Y:U:V=4:1:1. The present embodiment adopts the format of Y:U:V=4:2:2. Numeral 326 denotes an FIFO memory for buffer which is used to change the rate of the image data output from the memory I/F 322 into a different data rate.

Numeral 327 denotes a resizing circuit which resizes the image data from the FIFO memory 326 into the image data corresponding to a display size (e.g., 521×218 pixels) suitable for the LCD panel. Numeral 328 denotes a YUV/RGB converter which converts the image data of YUV format from the resizing circuit 327 into image data of RGB format, numeral 330 denotes a dot sequential converter which converts the parallel R, G and B outputs from the YUV/RGB converter 328 into data of RGB dot sequential format, numeral 331 denotes a clock shifter which makes the RGB dot sequential output from the dot sequential converter 330 synchronous with another clock, numeral 332 denotes a sync signal addition circuit which adds a sync signal to the RGB dot sequential signal output from the clock shifter 331, and numeral 334 denotes a P/S converter which converts the eight-bit parallel RGB dot sequential signal added with the sync signal of the sync signal addition circuit 332 into a serial signal of one to four bits. Numeral 336 denotes an LCD control circuit which parallelizes the image data from the P/S converter 334 according to a clock form an oscillator 338, and transfers the obtained parallel data to an LCD panel 340 for image display.

Numeral 342 denotes a TV system signal processing circuit which creates a brightness signal Y and a modified chroma signal C from the image signal of YUV format transferred from the FIFO memory 326, adds the brightness signal Y and the modified chroma signal C together to create and output composite image data. Numeral 344 denotes a D/A converter which converts the composite image data from the TV system signal processing circuit 342 into an analog signal, numeral 346 denotes an LPF which eliminates a high-frequency noise component from the output signal of the D/A converter 344, numeral 348 denotes a video amplifier which amplifies the output of the LPF 346, and numeral 350 denotes a TV monitor which displays as an image the composite image signal output from the video amplifier 348.

Numeral 352 denotes a display sync signal generation circuit which supplies a reading timing signal to the reading circuit 322b of the memory I/F 322 and the FIFO memory 326, and supplies a display timing signal to the resizing circuit 327, the YUV/RGB converter 328, the dot sequential converter 330, the TV system signal processing circuit 342 and the D/A converter 344, in accordance with an output of an appended oscillator 354. The oscillator 354 performs oscillation of 27 MHz, and the reading timing signal to the FIFO memory 326 is in synchronism with such the clock of 27 MHz. The display sync signal generation circuit 352 transfers the clock of 13.5 MHz obtained by dividing the clock of 27 MHz of the oscillator 354 into two to the D/A converter 344, and the D/A converter 344 converts the composite image data from the TV system signal processing circuit 342 into the analog signal in accordance with the clock of 13.5 MHz.

An operation of the image signal processing apparatus according to the second embodiment shown in FIG. 15 will be explained. It should be noted that the operations of the image pickup element 310, the A/D converter 312, the image pickup signal processing circuit 314, the resizing circuit 320 and the memory I/F 322 are the same as those of the corresponding parts according to the first embodiment shown in FIG. 1. However, the output image size of the resizing circuit 320 is horizontal 720 pixels and vertical 242 lines (field display) for the NTSC display system.

Like the first embodiment, the data writing to the FIFO memory 326 is performed at the rate of 18 MHz from the TG circuit 316. However, unlike the first embodiment, the data reading therefrom is performed in synchronism with the clock of 27 MHz from the oscillator 354 of the display sync signal generation circuit 352.

The TV system signal processing circuit 342 creates the brightness data added with the sync signal (Y+S) for TV display and the modified chroma signal C based on the NTSC system or the PAL system, from the image data of YUV format transferred from the FIFO memory 326. Then, the circuit 342 adds the brightness signal added with the sync signal (Y+S) and the modified chroma signal C together to create composite image data CV. The D/A converter 344 converts the composite image data from the TV system signal processing circuit 342 into the analog signal, and the LPF 346 eliminates the high-frequency noise component outside the image signal band from the output signal of the D/A converter 344. The video amplifier 348 adjusts the gain level of the output signal of the LPF 346, adjusts an output impedance to a TV standard, and transfers the obtained data to the TV monitor 350. Thus, an optical image incident on the image pickup element 310 is displayed as a visible image on the TV monitor 350. The display sync signal generation circuit 352 generates the various timing signals for the TV display.

On the other hand, the resizing circuit 327 performs the resizing of the output data of the FIFO memory 326 from the TV display size (horizonal 720×vertical 242) to the display size of the LCD panel 340 (horizontal 521×vertical 218). Since the image data to be input to the resizing circuit 327 has been already resized to the TV display size, the size of the resizing circuit 327 may be small. Unlike the YUV/RGB converter 28, the YUV/RGB converter 328 converts the YUV data of the NTSC or PAL system into the RGB data, i.e., the converter 328 converts the image data of YUV format output from the resizing circuit 327 into the image data of RGB format. The dot sequential converter 330 generates the dot sequential signal from the RGB output of the YUV/RGB converter 328. The dot sequential converter 330 is operated according to the clock of 27 MHz from the display sync signal generation circuit 352, and the generated RGB dot sequential data is input to the sync signal addition circuit 332 through the clock shifter 331 for making the data synchronous with the clock of the LCD control circuit 336.

Like the sync signal addition circuit 32, the sync signal addition circuit 332 adds a sync code for LCD to the input data. Further, like the P/S converter 34, the P/S converter 334 converts the eight-bit parallel data from the sync signal addition circuit 332 into the two or four serial data, and transfers the converted data to the LCD control circuit 336.

Like the LCD control circuit 36, the LCD control circuit 336 converts the RGB dot sequential serial data from the P/S converter 334 into the R, G and B analog signals, and transfers these signals to the LCD panel 340.

Third Embodiment

Figure 16:
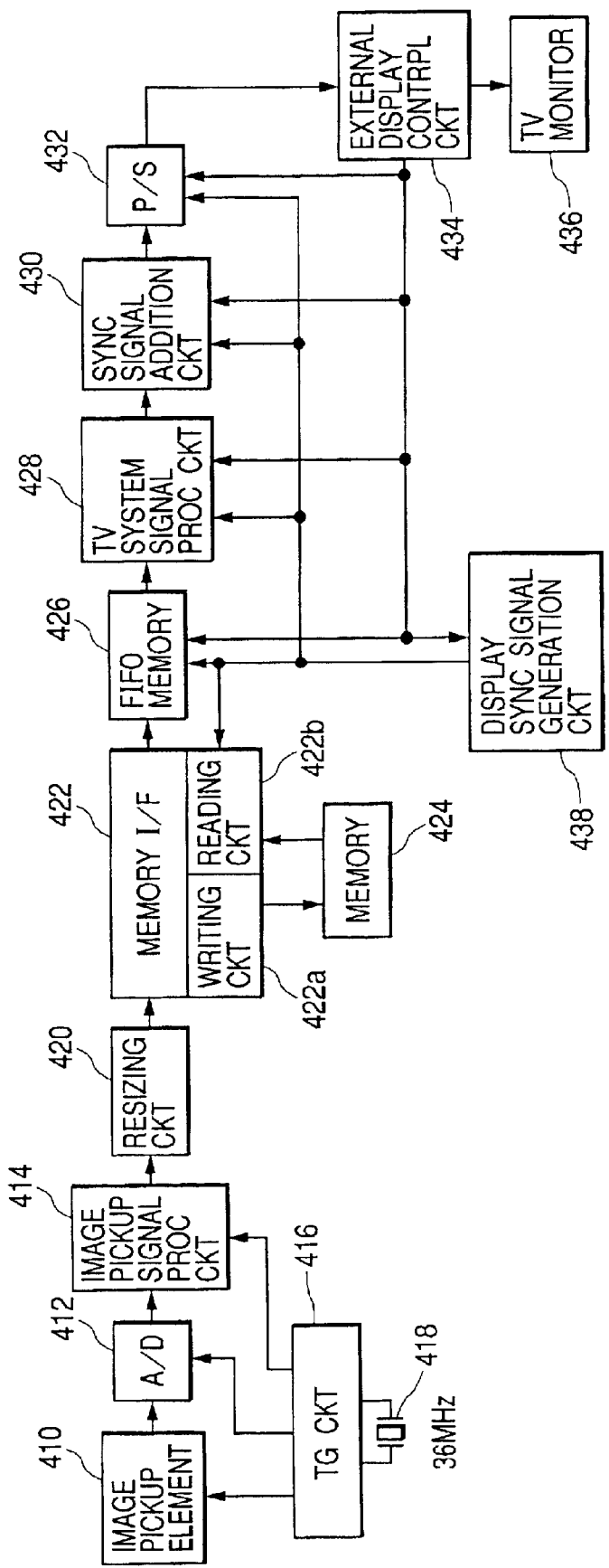
FIG. 16 is a block diagram showing a schematic structure of an image signal processing apparatus according to the third embodiment of the present invention.

FIG. 16 is a block diagram showing a schematic structure of an image signal processing apparatus according to the third embodiment of the present invention. In FIG. 16, operations of an image pickup element 410, an A/D converter 412, an image pickup signal processing circuit 414, a TG circuit 416, an oscillator 418, a resizing circuit 420, a memory I/F 422, a memory 424 and an FIFO memory 426 are respectively the same as the operations of the image pickup element 310, the A/D converter 312, the image pickup signal processing circuit 314, the TG circuit 316, the oscillator 318, the resizing circuit 320, the memory I/F 322, the memory 324 and the FIFO memory 426 shown in FIG. 15.

Numeral 428 denotes a TV system signal processing circuit which creates a brightness signal Y and a modified chroma signal C from the image signal of YUV format transferred from the FIFO memory 426, adds the brightness signal Y and the modified chroma signal C together to create and output composite image data. Numeral 430 denotes a sync signal addition circuit which adds a sync signal to the composite image data from the TV system signal processing circuit 428, and numeral 432 denotes a P/S converter which converts the eight-bit parallel composite image data added with the sync signal of the sync signal addition circuit 430 into a serial signal of one to four bits. Numeral 434 denotes an external display control circuit which parallelizes the serial image data from the P/S converter 432, converts the obtained parallel data into an analog signal, and transfers the obtained analog signal to a TV monitor 436.

Numeral 438 denotes a display sync signal generation circuit which supplies a reading timing signal to a reading circuit 442b of the memory I/F 422 and the FIFO memory 426, and supplies a display timing signal to the TV system signal processing circuit 428, the sync signal addition circuit 430 and the P/S converter 432, in accordance with a clock from the external display control circuit 434.

Figure 17:
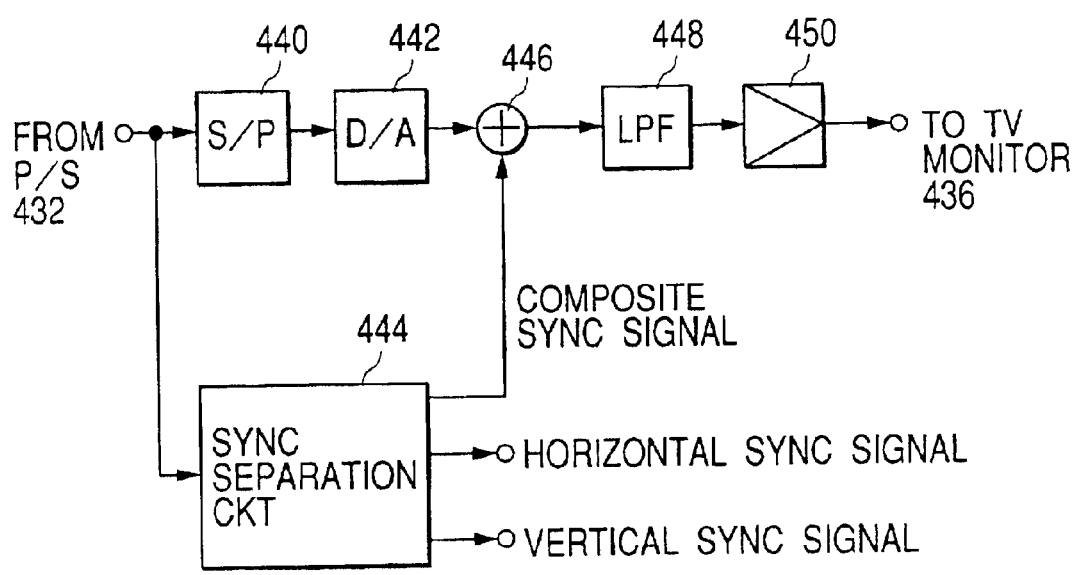
FIG. 17 is a block diagram showing a schematic structure of an external display control circuit 434.

FIG. 17 is a block diagram showing a schematic structure of the external display control circuit 434. In FIG. 17, an S/P converter 440 converts one to four serial data from the P/S converter 432 into eight-bit parallel data, and a D/A converter 442 converts the output data of the S/P converter 440 into an analog signal. A sync separation circuit 444 separates from one to four serial data from the P/S converter 432 a horizontal sync signal, a vertical sync signal and a composite sync signal. An adder 446 adds the composite sync signal from the sync separation circuit 444 to the output of the D/A converter 442. An LPF 448 eliminates a high-frequency noise component from the output signal of the adder 446. Then, a video amplifier 450 amplifies the signal from the LPF 448, adjusts an output impedance to a TV standard, and transfers the obtained data to the TV monitor 436.

An operation of the image signal processing apparatus according to the third embodiment shown in FIG. 16 will be explained. It should be noted that the operations of the image pickup element 410, the A/D converter 412, the image pickup signal processing circuit 414, the resizing circuit 420, the memory I/F 422, the memory 424 and the FIFO memory 426 are the same as those of the corresponding parts according to the second embodiment shown in FIG. 15.

The TV system signal processing circuit 428 creates the brightness data Y and the modified chroma signal C based on the NTSC system or the PAL system, from the image data of YUV format read from the FIFO memory 426. Then, the circuit 428 adds the brightness signal Y and the modified chroma signal C together to create the composite image data CV.

The sync signal addition circuit 430 adds a TV display sync code to the output data of the TV system signal processing circuit 428. Like the P/S converter 34, the P/S converter 432 converts the eight-bit parallel data from the sync signal addition circuit 430 into the two or four serial signal, and transfers the obtained serial data to the external display control circuit 434.

The external display control circuit 434 converts the serial data from the P/S converter 432 into the analog composite image signal, and transfers the converted signal to the TV monitor 436.

The third embodiment can be developed to the simultaneous display on the LCD panel and the TV monitor like the second embodiment. In this case, it is possible to completely eliminate D/A converters in the ASIC, and further it is possible to integrate the LCD control circuit and the external display control circuit.

Fourth Embodiment

Figure 18:
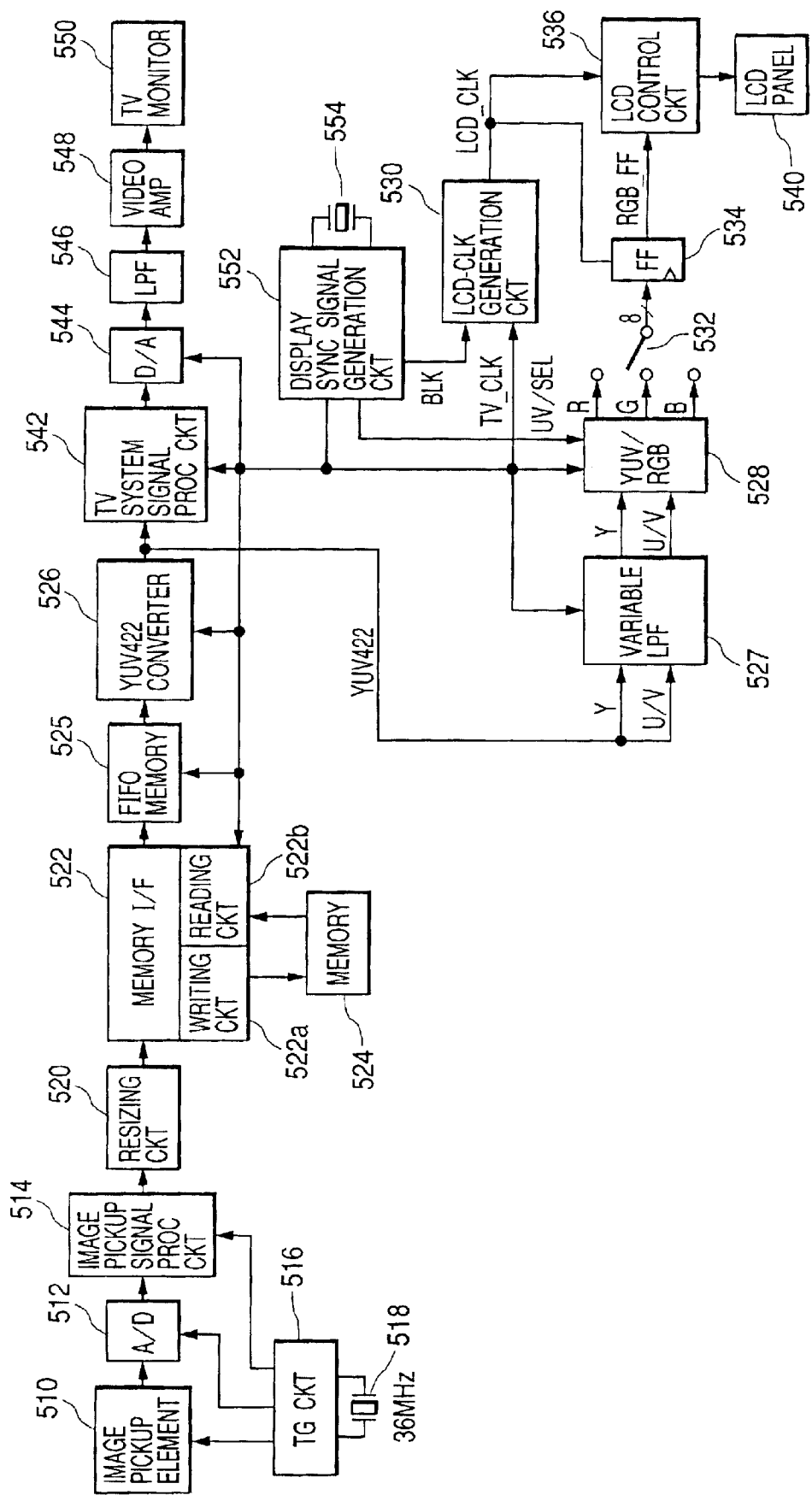
FIG. 18 is a block diagram showing a schematic structure of an image signal processing apparatus according to the fourth embodiment of the present invention.

FIG. 18 is a block diagram showing a schematic structure of an image signal processing apparatus according to the fourth embodiment of the present invention. In the present embodiment, as compared with the second embodiment, even if resolution of an LCD panel is remarkably lower than that of a TV monitor of about 280×220 pixels, a beautiful and clear image can be displayed simultaneously on both the LCD panel and the TV monitor.

In FIG. 18, numeral 510 denotes an image pickup element which converts an optical image into an electrical signal, and numeral 512 denotes an A/D converter which converts the analog image signal from the image pickup element 510 into a digital signal. Numeral 514 denotes an image pickup signal processing circuit which creates a brightness signal by performing color carrier elimination, aperture correction, a gamma process and the like to the output data of the A/D converter 512, and simultaneously creates a color difference signal by performing color interpolation, matrix conversion, a gamma process, gain adjustment and the like to the output data of the A/D converter 512, so as to create image data of YUV format. Numeral 516 denotes a TG circuit which generates clocks and timing signals necessary for the image pickup element 510, the A/D converter 512 and the image pickup signal processing circuit 514, in accordance with the output of a quartz oscillator (of which oscillation frequency is, e.g., 36 MHz) 518. Then, the TG circuit 516 supplies the generated clocks and timing signals to the image pickup element 510, the A/D converter 512 and the image pickup signal processing circuit 514.

Numeral 520 denotes a resizing circuit which resizes the image data from the image pickup signal processing circuit 514 into the image data corresponding to a display size of the TV monitor (720×484 pixels in case of NTSC of TV_CLK=13.5 MHz, 752×484 pixels in case of NTSC of TV_CLK=14.31818 MHz, and 736×576 pixels in case of PAL of TV_CLK=14.1875 MHz). Numeral 522 denotes a memory I/F which includes a writing circuit 522a and a reading circuit 522b for a memory (DRAM) 524. The memory I/F 522 writes the image data from the resizing circuit 520 in the memory 524, and reads image data stored in the memory 524. Numeral 525 denotes an FIFO memory for buffer which is used to change a rate of the image data output from the memory I/F 522 into a different data rate.

It should be noted that a memory space (so called a VRAM) for the image display is allocated on the memory 524. As well as the first embodiment, there are two kinds of image data storage formats on the VRAM, i.e., the format of Y:U:V=4:2:2 (hereinafter called a YUV422 format), and the format of Y:U:V=4:1:1 (hereinafter called a YUV411 format). The present embodiment adopts the format of Y:U:V=4:1:1. Namely, in the resizing circuit 520, the signal format of YUV=422 from the image pickup signal processing circuit 514 is converted into the data format of YUV=411 after the resizing conversion, and the converted data is output to the memory I/F 522. By adopting the VRAM of YUV411 format, sizes and data transfer quantities of the memory 524 and/or the FIFO memory 525 can be decreased.

Numeral 526 denotes a YUV422 converter which converts YUV411 format from the FIFO memory 525 into the YUV422 format. The output from the YUV422 converter 526 is the data format of Y:U:V=4:2:2 which has been already explained in the first embodiment. Further, immediately after the YUV422 conversion, the YUV422 converter 526 performs data level conversion to obtain Y, U and V signals of NTSC or PAL format, according to following expressions.

(YUV Conversion Expressions 1)

$Y=0.299R+0.587G+0.114B$ $U=0.493(B-Y)$ $V=0.877(R-Y)$

On the other hand, level relation expressions under Rec. ITU-R BT.601-5 Standard adopted in a digital video camera or a digital camera are as follows.

(YUV Conversion Expressions 2)

$Y=0.299R+0.587G+0.114B$ $U=0.564(B-Y)$ $V=0.713(R-Y)$

It should be noted that the above two sets of expressions are different from each other. When a YUV format is converted into an RGB format (later described), inverse conversion of the above expressions (YUV Conversion Expressions 1) of NTSC or PAL format is performed.

Numeral 542 denotes a TV system signal processing circuit which creates a brightness signal Y and a modified chroma signal C from the image signal of YUV422 format from the YUV422 converter 526, adds the brightness signal Y and the modified chroma signal C together to create and output composite image data. Numeral 544 denotes a D/A converter which converts the composite image data from the TV system signal processing circuit 542 into an analog signal, numeral 546 denotes an LPF which eliminates a high-frequency noise component from the output signal of the D/A converter 544, numeral 548 denotes a video amplifier which amplifies the output of the LPF 546, and numeral 550 denotes a TV monitor which displays as an image the composite image signal output from the video amplifier 548.

Numeral 552 denotes a display sync signal generation circuit which supplies a reading timing signal to the reading circuit 522b of the memory I/F 522 and the FIFO memory 525, and supplies a display timing signal or a clock TV_CLK to the YUV422 converter 526, a variable LPF 527, a YUV/RGB converter 528, an LCD_CLK generation circuit 530, a dot sequential converter 532, the TV system signal processing circuit 542 and the D/A converter 544, in accordance with a clock from an appended oscillator 554. The oscillator 554 performs oscillation of, e.g., 27 MHz, and the display sync signal generation circuit 552 transfers as the clock TV_CLK the clock of 13.5 MHz obtained by dividing the clock of 27 MHz of the oscillator 554 into two to the D/A converter 544. The D/A converter 544 converts the composite image data from the TV system signal processing circuit 542 into the analog signal in accordance with the clock of 13.5 MHz.

Three kinds of frequencies 13.5 MHz, 14.31818 MHz and 14.1875 MHz are thought as the clock TV_CLK. The reason thereof will be explained hereinafter. A horizontal sync frequency fH and a subcarrier frequency fsc in the NTSC format are given respectively as fH=4.5/286 (MHz) and fsc=(455/2)·fH (MHz). Thus, an oscillation frequency fNTSC suitable to generate both the frequencies fH and fsc is given as fNTSC=910fH=14.31818 (MHz). Since a horizontal image (or video) interval is 52.625 μsec, a horizontal pixel size Hsize is given as Hsize=52.625 (μsec)×14.31818 (MHz)=753.92. Here, the horizontal pixel size is given as 752 pixels because 752 pixels can be just divided by every eight pixels.

Further, a horizontal sync frequency fH and a subcarrier frequency fsc in the PAL format are given respectively as fH=50×625/2 (Hz) and fsc=(1135/4)·fH+25 (Hz). Since an oscillation frequency suitable to generate both the frequencies fH and fsc can not be easily found, a frequency fPAL which is close to the frequency fNTSC and suitable to generate the frequency fH is given as fPAL=908fH=14.1875 (MHz). Since a horizontal image (or video) interval is 52.0 μsec, a horizontal pixel size Hsize is given as Hsize=52.0 (μsec)×14.1875 (MHz)=737.75. Here, the horizontal pixel size is given as 736 pixels because 736 pixels can be just divided by every eight pixels.

On the basis of Rec. ITU-R BT.656-4 Standard, the subcarrier frequency fsc is given as fsc=13.5 (MHz), and the horizontal pixel size is given as 720 pixels in both 525/60 format and 625/50 format.

Therefore, the timing signal from the display sync signal generation circuit 552 and the VRAM size of the memory 524 are different according to the frequency of the clock TV_CLK. For example, in a case where the VRAM size is matched to a TV standard of NTSC format or PAL format, if the clock TV_CLK is 13.5 MHz, the VRAM size in NTSC format is given as a horizontal 720×vertical 484 frame image or a horizontal 720×vertical 242 field image, and the VRAM size in PAL format is given as a horizontal 720×vertical 576 frame image or a horizontal 720×vertical 288 field image. If the clock TV_CLK is 14.31818 MHz, the VRAM size in NTSC format is given as a horizontal 752×vertical 484 frame image or a horizontal 752×vertical 242 field image. If the clock TV_CLK is 14.1875 MHz, the VRAM size in PAL format is given as a horizontal 736×vertical 576 frame image or a horizontal 736×vertical 288 field image.

The variable LPF 527 is used to beautifully display the image data (e.g., 720×484 pixels) from the YUV422 converter 526 on an LCD panel (e.g., 280×220 dots). By the variable LPF 527, a beautiful image from which noises such as aliasing and the like have been eliminated can be displayed on the LCD panel. Further, a frequency characteristic of the variable LPF 527 is changeable. For example, by changing this frequency characteristic according to display resolution of the LCD panel, image quality displayed on the LCD panel can be optimized.

Numeral 528 denotes the YUV/RGB converter which converts the image data of YUV format from the variable LPF 527 into image data of RGB format. Unlike the YUV/RGB converter 28 in the first embodiment, the YUV/RGB converter 528 in the present embodiment converts the YUV data of NTSC or PAL format into the data of RGB format.

Numeral 530 denotes an LCD_CLK generation circuit which generates an LCD clock LCD_CLK from the clock TV_CLK. The LCD_CLK generation circuit 530 generates thinned-out clocks suitable for the LCD dots, from the clock TV_CLK of 13.5 MHz, 14.31818 MHz, 14.1875 MHz or the like, whereby the clock frequency is reduced. For example, when the frequency of the clock TV_CLK is 13.5 MHz, since the VRAM field data is 720×242 pixels, it is necessary to thin out the horizontal pixels based on a thinning rate $280/720=7/18$ to display the VRAM field data on the LCD panel of 280×220 dots. Timing in this case is shown in FIG. 22.

Figure 22:
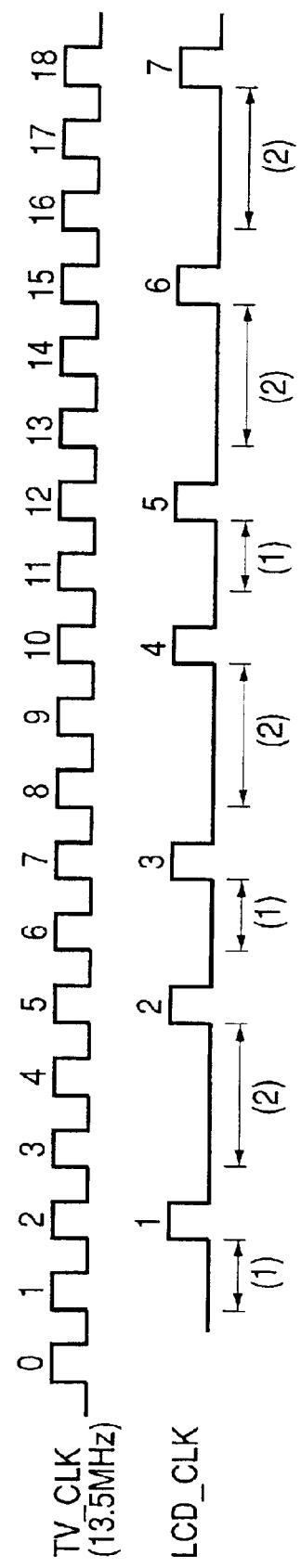
FIG. 22 is an operation timing chart for an LCD_CLK generation circuit 530.

In FIG. 22, 11 clocks are thinned out from 18 clocks TV_CLK to extract seven clocks, whereby (7/18) clocks are generated. There are several methods to thin out the 11 clocks. In the present embodiment, 1·2·1·2·1·2·2 thinning-out of the clocks is performed to thin out the 11 clocks. It should be noted that, if as even thinning-out as possible is performed, a more beautiful display can be obtained on the LCD panel.

Although it is not shown, when the frequency of the clock TV_CLK is 14.31818 MHz, since the VRAM field data is 752×242 pixels, it is necessary to thin out the horizontal pixels based on a thinning rate $280/752=35/94$ to display the VRAM field data on the LCD panel of 280×220 dots. In this case, from the 94 clocks TV_CLK, thinning-out of the clocks 1·2·2·1·2·2·1·2·2·1·2·2·1·2·1·2·2·1·2·2·1·2·2·1·2·2·2·1·2·2·2 may be performed to thin out the 59 clocks.

When the frequency of the clock TV_CLK is 14.1875 MHz, since the VRAM field data is 736×242 pixels, it is necessary to thin out the horizontal pixels based on a thinning rate $280/737=35/92$ to display the VRAM field data on the LCD panel of 280×220 dots. In this case, from the 92 clocks TV_CLK, thinning-out of the clocks 1·2·1·2·2·1·2·2·1·2·1·2·2·1·2·2·1·2·1·2·2·1·2·2·1·2·1·2·2·1·2·2 may be performed to thin out the 57 clocks.

Since the thinning rate $280/720=7/18$ is also given as $35/90$, the numerator of the thinning rate is given as "35" in any of the frequencies 13.5 MHz, 14.31818 MHz and 14.1875 MHz. Thus, in an actual case, it is possible to achieve the circuit capable of responding to the clock TV_CLK of any kind of frequency by changing a counter for a denominator of the thinning rate and a thinning interval.

The dot sequential converter 532 converts the parallel R, G and B outputs from the YUV/RGB converter 528 into data of RGB dot sequential format. In this case, the dot sequential converter 532 thins out the data by changing R, G and B components according to the clock LCD_CLK. This corresponds to the substantial resizing and data rate changing.

Namely, the dot sequential converter 532 converts the output of the YUV/RGB converter 528 into the LCD data (e.g., 280×220 dots).

An FF 534 latches the output of the dot sequential converter 532 in response to the trailing edge of the clock LCD_CLK, and outputs the latched data. An LCD control circuit 536 transfers the image data from the FF 534 to an LCD panel 540 for image display in accordance with the clock LCD_CLK output from the LCD CLK generation circuit 530.

Figure 19:
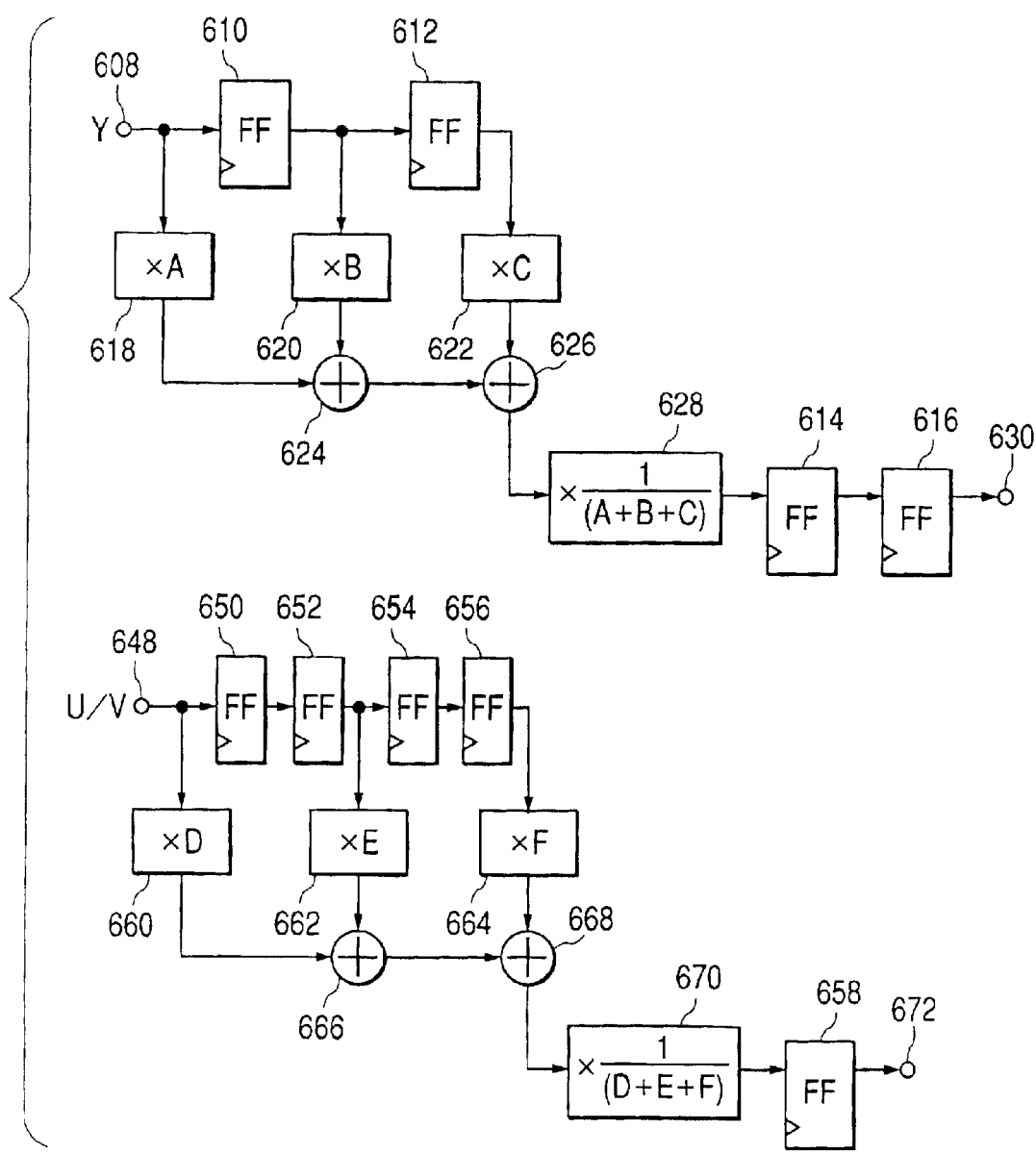
FIG. 19 is a block diagram showing a schematic structure of a variable LPF 527.

FIG. 19 is a block diagram showing an internal structure of the variable LPF 527. In FIG. 19, numeral 608 denotes an input terminal through which the eight bit brightness signal Y is input from the YUV422 converter 526, and numerals 610, 612, 614 and 616 denote FF's which operate in response to the clock TV_CLK. Numeral 618 denotes a multiplier which multiplies the no-delay brightness signal from the input terminal 608 by a coefficient A, numeral 620 denotes a multiplier which multiplies the one-clock-delay output from the FF 610 by a coefficient B, and numeral 622 denotes a multiplier which multiplies the two-clock-delay output from the FF 612 by a coefficient C. As each of the coefficients A, B and C for the multipliers 618, 620 and 622, e.g., an arbitrary numeral selectable from 0 to 255 can be set.

Numeral 624 denotes an adder which adds the outputs of the multipliers 618 and 620 together, and numeral 626 denotes an adder which adds the output of the multiplier 622 and the output of the adder 624 together. Numeral 628 denotes a multiplier which multiplies the output of the adder 626 by the reciprocal of a coefficient (A+B+C) or a divider which divides the output of the adder 626 by the coefficient (A+B+C). The FF 614 latches the output data of the adder 628 according to the clock TV_CLK, and adjusts delays of bit values of the Y data. The FF 616 delays the signal Y by one clock to adjust delay timing of the signals Y, U and V. The part made by the elements 610 to 626 constitutes a three-tap digital filter for the brightness signal. Then, the signal Y which has been low-pass filtered is output from an output terminal 630.

For example, when the coefficients A=1, B=2 and C=1, an LPF which has a zero point at the ½ frequency point of the clock TV_CLK with transfer coefficient (121) can be obtained. When the coefficients A=1, B=0 and C=1, a notch filter which has a zero point at the ¼ frequency point of the clock TV_CLK with transfer coefficient (101) can be obtained. Further, when the coefficients A=1, B=6 and C=1, an LPF which has a ½ gain at the ½ frequency point of the clock TV_CLK with transfer coefficient (161) can be obtained. Thus, the arbitrary three-tap LPF for the brightness signal can be obtained.

Numeral 648 denotes an input terminal through which the eight bit dot sequential signals U and V are input from the YUV422 converter 526, and numerals 650, 652, 654, 656 and 658 denote FF's which operate in response to the clock TV_CLK. Numeral 660 denotes a multiplier which multiplies the no-delay color difference signals U and V from the input terminal 648 by a coefficient D, numeral 662 denotes a multiplier which multiplies the two-clock-delay output from the FF 652 by a coefficient E, and numeral 664 denotes a multiplier which multiplies the four-clock-delay output from the FF 656 by a coefficient F. As each of the coefficients D, E and F for the multipliers 660, 662 and 664, e.g., an arbitrary numeral selectable from 0 to 255 can be set.

Numeral 666 denotes an adder which adds the outputs of the multipliers 660 and 662 together, and numeral 668 denotes an adder which adds the output of the multiplier 664 and the output of the adder 666 together. Numeral 670 denotes a multiplier which multiplies the output of the adder 668 by the reciprocal of a coefficient (D+E+F) or a divider which divides the output of the adder 668 by the coefficient (D+E+F). The FF 658 latches the output data of the adder 670 according to the clock TV_CLK, and adjusts delays of bit values of the U and V data. The part made by the elements 650 to 670 constitutes a five-tap digital filter for the color difference signals U and V. Then, the signals U and V which have been low-pass filtered are output from an output terminal 672.

For example, when the coefficients D=1, E=2 and F=1, a notch filter which has a zero point at the ¼ frequency point of the clock TV_CLK with transfer coefficient (10201) can be obtained. Further, when the coefficients A=1, B=6 and C=1, a notch filter which has a ½ gain at the ¼ frequency point of the clock TV_CLK with transfer coefficient (10601) can be obtained.

Thus, the five-tap digital filter can be provided respectively for the U and V data of the dot sequential signal. While the digital filter for the brightness signal has the three taps, the digital filter for the color difference signals has the five taps. This is because it is necessary to operate the same color data at intervals of one pixel since the color difference signals U and V are the dot sequential signals, and characteristics of the color difference signals are suitable for the five-tap structure since each of their bands is half of the band of the brightness signal.

Figure 20:
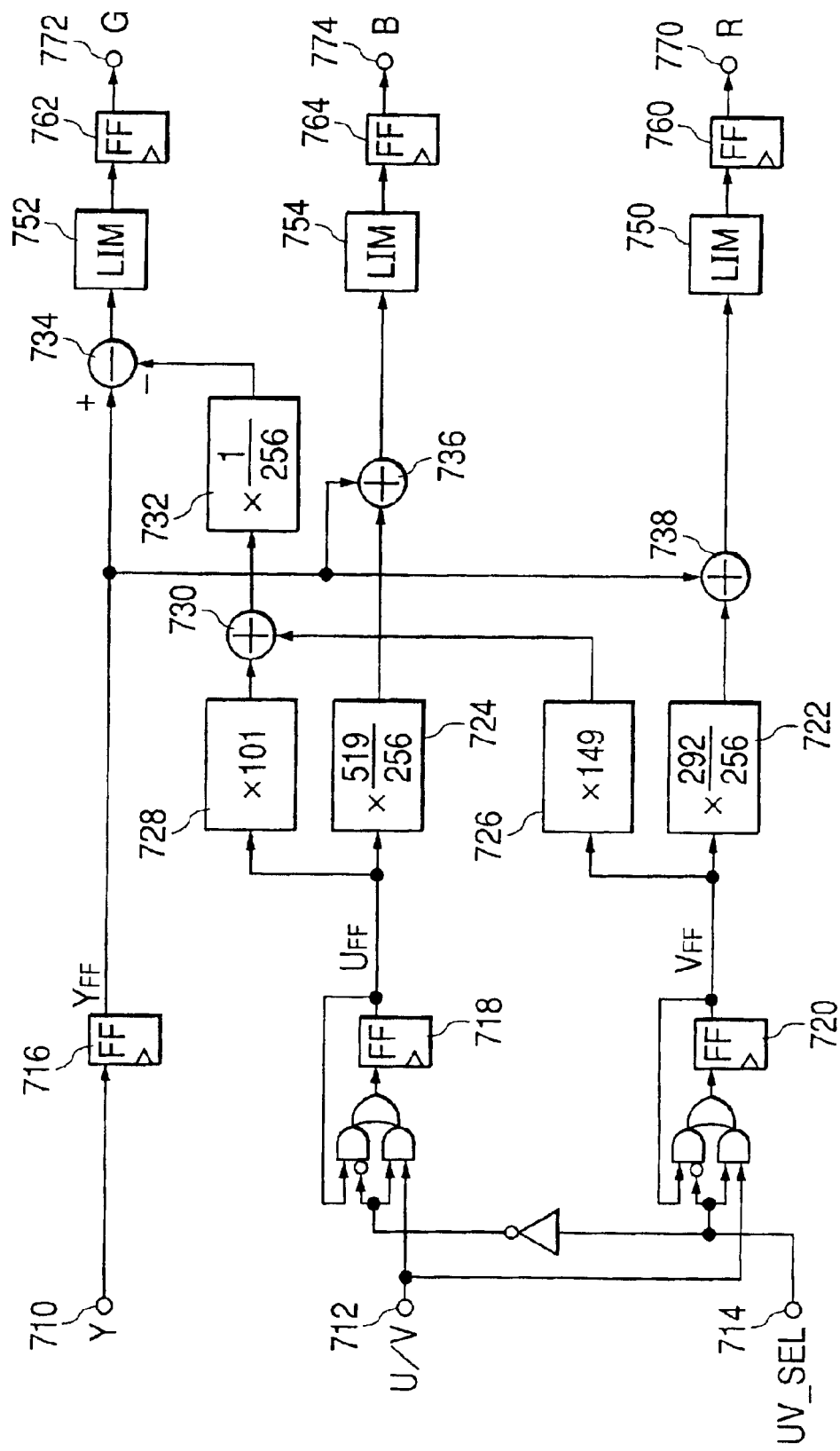
FIG. 20 is a block diagram showing a schematic structure of a YUV/RGB converter 528.

FIG. 20 is a block diagram showing an internal structure of the YUV/RGB converter 528. Relation expressions for converting the signal of YUV format into the signal of RGB format are as follows.

$$Y = 0.299R + 0.587G + 0.114B$$

$$U = 0.493(B - Y)$$

$$V = 0.877(R - Y)$$

Thus, inverse conversion thereof can be given as follows.

$$R = Y + (1/0.877)V$$
$$= Y + (292/256)V$$
$$B = Y + (1/0.493)V$$
$$= Y + (519/256)V$$
$$G = (1/0.587)Y - (0.299/0.587)R - (0.114/0.587)B$$
$$= Y - (0.299/0.587)(292/256)V -$$
$$(0.114/0.587)(519/256)U$$
$$= Y - (149V + 101U)/256$$

FIG. 20 shows an example of the circuit which realizes the above conversion expressions. In FIG. 20, numeral 710 denotes an input terminal through which the brightness signal Y is input from the LPF 527, numeral 712 denotes an input terminal through which the dot sequential color difference signal is input from the LPF 527, and numeral 714 denotes an input terminal through which a UV discrimination signal UV_SEL for the UV dot sequential signals is input from the display sync signal generation circuit 552. Numeral 716 denotes an FF which delays the clock TV_CLK by one, numeral 718 denotes an FF which latches the signal U when the UV discrimination signal UV_SEL is L (low), and numeral 720 denotes an FF which latches the signal V when the UV discrimination signal UV_SEL is H (high).

Numeral 722 denotes a coefficient multiplier which multiplies the signal V by a fixed value (292/256) to calculate an R signal, numeral 724 denotes a coefficient multiplier which multiplies the signal U by a fixed value (519/256) to calculate a B signal, numeral 726 denotes a coefficient multiplier which multiplies the signal V by a fixed value (149) to calculate a G signal, and numeral 728 denotes a coefficient multiplier which multiplies the signal U by a fixed value (101) to calculate the G signal.

Numeral 730 denotes an adder which adds the outputs of the coefficient multipliers 726 and 728 together, numeral 732 denotes a shifter which bit-shifts the output data of the adder 730 toward a lower direction by eight bits, and numeral 734 denotes a subtracter which subtracts the output of the shifter 732 from the signal Y output by the FF 716. Numeral 736 denotes an adder which adds the output of the coefficient amplifier 724 and the signal Y output by the FF 716, and numeral 738 denotes an adder which adds the output of the coefficient amplifier 722 and the signal Y output by the FF 716.

Numerals 750, 752 and 754 denote limiters which respectively limit the R, G and B signals representing even negative values to positive values, and numerals 760, 762 and 764 denote FF's which respectively latch the output data of the limiters 750, 752 and 754 according to the clock TV_CLK.

By the above structure, the signal of YUV format is converted into the signal of RGB format. Then, the R signal is output through an output terminal 770, the G signal is output through an output terminal 772, and the B signal is output through an output terminal 774.

The operation of the image signal processing apparatus according to the present embodiment shown in FIG. 18 in the case where the frequency of the clock TV_CLK is 13.5 MHz will be explained. In the present embodiment, although the operations from the image pickup element 510 to the FIFO memory 525 are substantially the same as those of the corresponding parts of the second embodiment, a conversion circuit for converting the YUV422 format into the YUV411 format is provided in the resizing circuit 520. This conversion circuit may thin out the U and V data to halve them. Further, the signal or data flow from the TV system signal processing circuit 542 to the TV monitor 550 is substantially the same as that on the corresponding parts of the second embodiment, whereby the explanation thereof will be omitted.

The YUV422 converter 526 performs interpolation of the average value of the signals U and V of the data of YUV411 format output from the FIFO memory 525, and converts the data of YUV411 format into the data of YUV422 format. The output of the YUV422 converter 526 is input to the variable LPF 527. In the variable LPF 527, the signal Y and the signals U and V are respectively subjected to the appropriate LPF processes, the bands of these signals are appropriately limited, and then the obtained signals are input to the YUV/RGB converter 528.

Figure 21:
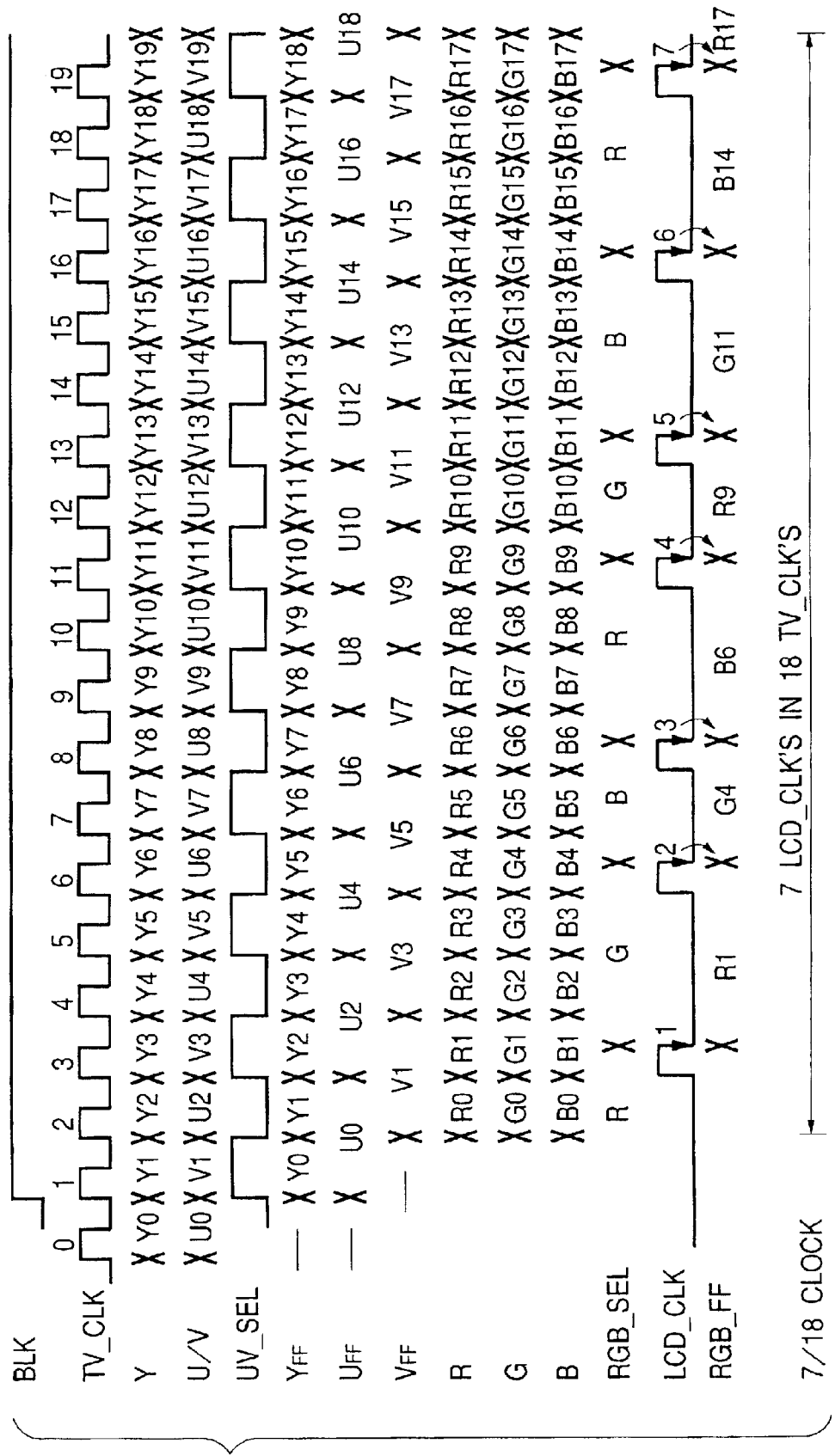
FIG. 21 is an operation timing chart for the structures shown in FIGS. 18 and 19.

FIG. 21 shows signal and data timing from the YUV/RGB converter 528 to the LCD control circuit 536. The operation of the present embodiment will be explained with reference to FIG. 21.

In FIG. 21, a signal BLK is a blanking signal which is transferred from the display sync signal generation circuit 552 to the LCD_CLK generation circuit 530. The LCD_CLK generation circuit 530 uses the signal BLK as a sync signal to adjust generation timing of the clock LCD_CLK. When the signal BLK is H, the clock LCD_CLK is given as 7/18 thinned-out clock TV_CLK. When the signal BLK is L, the LCD_CLK generation circuit 530 generates the clock LCD_CLK in a programmable manner to supply necessary clocks in the blanking interval. The signal BLK is acceptable with the blanking signal of the FIFO memory 525 even if common. However, in this case, in consideration of the delay from the FIFO memory 525 to the dot sequential converter 532, it is necessary for the LCD_CLK generation circuit 530 to give sync timing.

In FIG. 21, the clock TV_CLK is the clock of 13.5 MHz which is output from the display sync signal generation circuit 552. The signals Y, U/V and UV_SEL are the signals which are input to the YUV/RGB converter 528. Signals $Y_{FF}$, $U_{FF}$ and $V_{FF}$ are the signals which are respectively output from the FF's 716, 718 and 720 of the YUV/RGB converter 528. The signals R, G and B are the R, G and B outputs of the YUV/RGB converter 528. A signal RGB_SEL represents which of the signals R, G and B is being selected to be input to the dot sequential converter 532. The signal RGB_SEL is changed in synchronism with the trailing edge of the clock LCD_CLK.

As explained in the first embodiment, it is possible by the signal RGB_SEL to select any one of the following six modes.

mode #0: R,G,B,R,G,B, . . .

mode #1: G,B,R,G,B,R, . . .

mode #2: B,R,G,B,R,G, . . .

mode #3: R,B,G,R,B,G, . . .

mode #4: B,G,R,B,G,R, . . .

mode #5: G,R,B,G,R,B, . . .

Namely, the mode is selected according to a dot color arrangement (e.g., a delta arrangement, a stripe arrangement, etc.) on the LCD panel. Even if the mode is different for each line, the above modes are selectable. FIG. 21 shows the case of the mode #0.

As described above, the clock LCD_CLK is obtained by thinning out the clocks TV_CLK by 7/18 with the LCD_CLK generation circuit 530. A signal RGB_FF is the output from the FF 534. FIG. 21 shows the interval of the clock TV_CLK, i.e., the interval from the clock 0 to the clock 19. In synchronism with the leading edge of the clock 0, Y0 is input to the signal Y, and U0 is input to the signal U/V. Then, in synchronism with the leading edge of the clock 1, Y1 is input to the signal Y, and V1 is input to the signal U/V. After then, in synchronism with every leading edge of the clock TV_CLK, Y2, Y3, . . . are sequentially input as the signal Y, and U2, V3, . . . are sequentially input as the signal U/V.

Further, Y0, Y1, . . . are sequentially input as the signal $Y_{FF}$ as being delayed from the signal Y by one clock. In synchronism with the leading edge of the clock TV_CLK, the signal $U_{FF}$ has the value obtained by latching the U signal part of the signal U/V in the case where the signal UV_SEL is L. In synchronism with the leading edge of the clock TV_CLK, the signal $V_{FF}$ has the value obtained by latching the V signal part of the signal U/V in the case where the signal UV_SEL is H.

The R signal is generated by the conversion of R=Y+(292/256)V of the YUV/RGB converter 528. The R signal is output sequentially as R0, R1, R2, . . . from the second clock in synchronism with the leading edge of the clock TV_CLK. The G signal is generated by the conversion of G=Y−(149V+101U)/256 of the YUV/RGB converter 528. The G signal is output sequentially as G0, G1, G2, . . . from the second clock in synchronism with the leading edge of the clock TV_CLK. The B signal is generated by the conversion of B=Y+(519/256)U of the YUV/RGB converter 528. The B signal is output sequentially as B0, B1, B2, . . . from the second clock in synchronism with the leading edge of the clock TV_CLK.

The signal RGB_FF is obtained by latching the color selected based on the signal RGB_SEL in synchronism with the trailing edge of the clock LCD_CLK. Namely, R1 is latched at the first clock of the clock LCD_CLK, G4 is latched at the second clock, and B6 is latched at the third clock. After then, the latch is repeated while sequentially switching R, G and B. The signal RGB_FF output from the FF 534 is the signal which has been converted to have horizontal 280 dots for LCD operation.

Since the clock LCD_CLK is the gated clock, the delay when the clock is generated is worried. Further, when the LCD control circuit 536 latches the data at the leading edge of the clock LCD_CLK, setup/hold can be easily performed. In these points of view, as shown in FIG. 21, the change of the dot sequential converter 532 and the output of the signal RGB_FF from the FF 534 are performed in synchronism with the trailing edge of the clock LCD_CLK. According to timing relation, although the process of the actual circuit is predominant, the change of the dot sequential converter 532 and the output of the signal RGB_FF from the FF 534 may be performed in synchronism with the leading edge of the clock LCD_CLK.

The signal RGB_FF output from the FF 534 is input to the LCD control circuit 536. The LCD control circuit 536 performs the driving such that the RGB dot sequential data matched with the LCD operation can be displayed on the LCD panel 540. Further, the LCD control circuit 536 may perform voltage/current conversion to the output of the FF 534 and transfer the converted data to the LCD panel 540. The LCD panel 540 displays the input image data as a visible image based on its display capability of 280×220 dots. Unlike the LCD clock in the LCD control circuit 336, the LCD control circuit 536 is operated in synchronism with the clock LCD_CLK from the LCD_CLK generation circuit 530.

Fifth Embodiment

Figure 23:
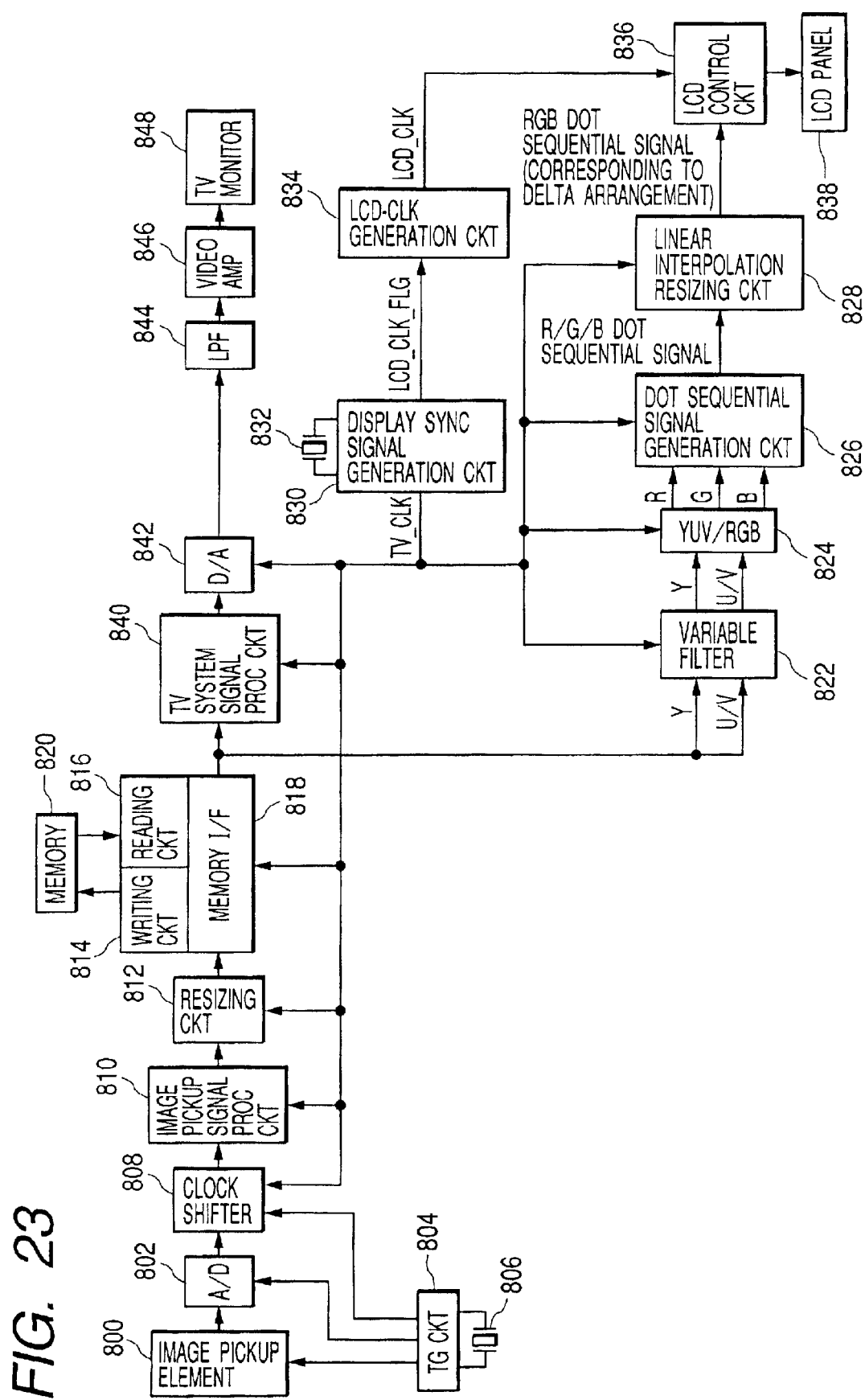
FIG. 23 is a block diagram showing a schematic structure of an image signal processing apparatus according to the fifth embodiment of the present invention.

FIG. 23 is a block diagram showing a schematic structure of an image signal processing apparatus according to the fifth embodiment of the present invention. In the present embodiment, as compared with the fourth embodiment, RGB dot sequential data is resized by a bilinear operation, whereby spatially continuous image data can be obtained, and a more beautiful display can be thus obtained on an LCD panel. Further, in the present embodiment, as compared with the second embodiment, since the resizing is performed after the RGB dot sequential data was obtained, it is unnecessary to provide a resizing circuit for each of R, G and B. Thus, since the present embodiment is executable with a single resizing circuit for all of R, G and B, an entire size of the circuit can be reduced.

In FIG. 23, numeral 800 denotes an image pickup element which converts an optical image into an electrical signal, and numeral 802 denotes an A/D converter which converts the analog image signal from the image pickup element 800 into a digital signal. Numeral 804 denotes a TG circuit which generates clocks and timing signals necessary for the image pickup element 800, the A/D converter 802 and a clock shifter 808, in accordance with the output of a quartz oscillator (of which oscillation frequency is, e.g., 36 MHz) 806.

Numeral 808 denotes the clock shifter which shifts the output data of the A/D converter 802 synchronous with the oscillator 806 to data synchronous with a clock TV_CLK of circuits posterior to a later-described image signal processing circuit 810. Namely, the function of the clock shifter 808 is the same as that of the clock shifter 331 in the second embodiment. For example, the clock shifter 808 may be achieved by the circuit which constitutes the FIFO memory 26 and the like in the first embodiment. In the present embodiment, the SRAM of the FIFO memory 26 is replaced by an FF to provide the FIFO memory of which the number of stages is small.

Numeral 810 denotes the image pickup signal processing circuit which creates a brightness signal by performing color carrier elimination, aperture correction, a gamma process and the like to the output data of the clock shifter 808, and simultaneously creates a color difference signal by performing color interpolation, matrix conversion, a gamma process, gain adjustment and the like to the output data of the clock shifter 808, so as to create image data of YUV format. The image pickup signal processing circuit 810 is equivalent to the image pickup signal processing circuit 514 in the fourth embodiment.

Numeral 812 denotes a resizing circuit which resizes the image data transferred from the image pickup signal processing circuit 810. The resizing circuit 812 is equivalent to the resizing circuit 520 in the fourth embodiment. Numeral 818 denotes a memory I/F which includes a writing circuit 814 and a reading circuit 816 for a memory (DRAM) 820. The memory I/F 818 writes the image data from the resizing circuit 812 in the memory 820, and reads image data stored in the memory 820. Also, the memory I/F 818 is equivalent to the memory I/F 522 in the fourth embodiment.

Like the first and fourth embodiments, a memory space (i.e., a VRAM) for the image display has been allocated on the memory 820, and there are two kinds of image data storage formats on the VRAM, i.e., the format of Y:U:V= 4:2:2, and the format of Y:U:V=4:1:1. The present embodiment adopts the format of Y:U:V=4:2:2. Namely, the image data of YUV422 format from the image pickup signal processing circuit 810 through the resizing circuit 812 is written in the DRAM 820 through the memory I/F 818, and thus the VRAM is established.

Numeral 840 denotes a TV system signal processing circuit which is equivalent to the TV system signal processing circuit 542, numeral 842 denotes a D/A converter which converts the composite image data from the TV system signal processing circuit 840 into an analog signal, numeral 844 denotes an LPF which eliminates a high-frequency noise component from the output signal of the D/A converter 842, numeral 846 denotes a video amplifier which amplifies the output of the LPF 844, and numeral 848 denotes a TV monitor which displays as an image the composite image signal output from the video amplifier 846.

Numeral 830 denotes a display sync signal generation circuit which generates a display timing signal on the basis of a clock of an appended oscillator 832. The display sync signal generation circuit 830 supplies the display timing signal or a clock TV_CLK to the clock shifter 808, the image pickup signal processing circuit 810, the resizing circuit 812, the memory I/F 818, a variable filter 822, a YUV/RGB converter 824, an LCD_CLK generation circuit 834, a dot sequential signal generation circuit 826, the TV system signal processing circuit 840 and the D/A converter 842.

The oscillator 832 performs oscillation of, e.g., 27 MHz, and the display sync signal generation circuit 830 transfers as the clock TV_CLK the clock of 13.5 MHz obtained by dividing the clock of 27 MHz of the oscillator 832 into two to the D/A converter 842. The D/A converter 842 converts the composite image data from the TV system signal processing circuit 840 into the analog signal in accordance with the clock of 13.5 MHz. In this case, three kinds of frequencies 13.5 MHz, 14.31818 MHz and 14.1875 MHz are thought as the clock TV_CLK. The reason thereof was explained in the fourth embodiment.

Numeral 822 denotes the variable filter which is used to beautifully display the image data (e.g., 720×484 pixels) from the memory I/F 818 on an LCD panel (e.g., 280×220 dots). The variable filter 822 has the circuit structure based on the variable LPF 527 in the fourth embodiment. For example, the number of taps of the variable filter 822 is "7" as compared with the variable LPF 527. By the variable filter 822, a beautiful image from which noises such as aliasing and the like have been eliminated or of which the resolution is increased by raising a halftone band can be displayed on the LCD panel. Further, a frequency characteristic of the variable filter 822 is changeable. For example, by changing this frequency characteristic according to display resolution of the LCD panel, image quality displayed on the LCD panel can be optimized.

Numeral 824 denotes the YUV/RGB converter which has the circuit structure based on the YUV/RGB converter 528 in the fourth embodiment and converts the image data of YUV format from the variable filter 822 into image data of RGB format. Numeral 826 denotes a dot sequential signal generation circuit which generates an RGB dot sequential signal from the R, G and B signals output from the YUV/RGB converter 824. Thus, the dot sequential signal generation circuit 826 is different from the dot sequential converter 532 in the fourth embodiment. Numeral 828 denotes a linear interpolation resizing circuit which resizes the RGB dot sequential signal output from the dot sequential signal generation circuit 826, according to the interpolation based on a bilineary operation. Numeral 834 denotes the LCD_CLK generation circuit which generates the LCD display clock LCD_CLK based on the clock TV_CLK. Unlike the LCD_CLK generation circuit 530 in the fourth embodiment slightly, the LCD_CLK generation circuit 834 thins out the clocks LCD_CLK according to the output of the linear interpolation resizing circuit 828, whereby the thinned-out clocks are generated. Numeral 836 denotes an LCD control circuit which processes the RGB dot sequential signal from the linear interpolation resizing circuit 828 according to the clock LCD_CLK from the LCD_CLK generation circuit 834, and transfers the obtained data to an LCD panel 838 for image display.

Figure 24:
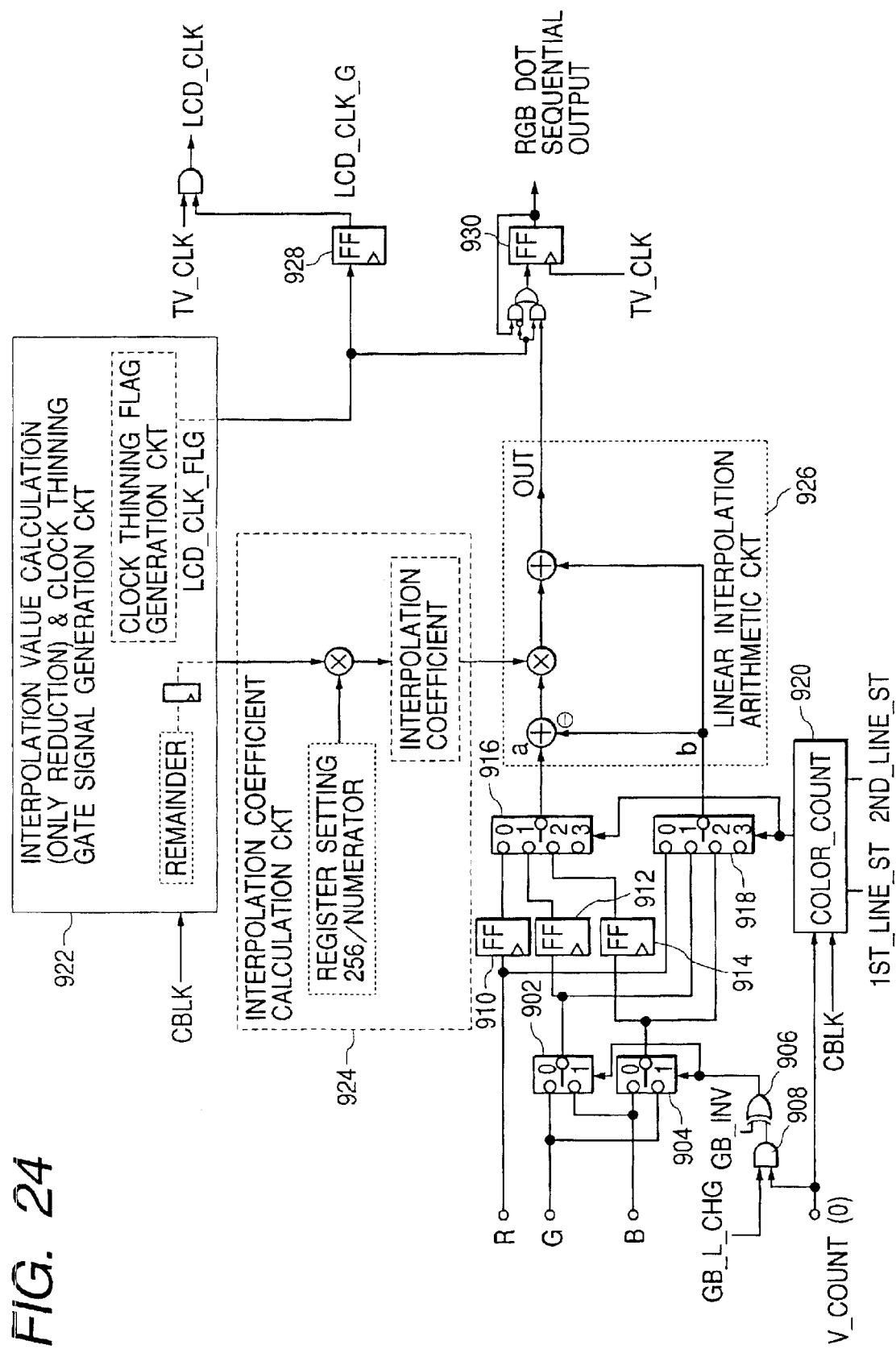
FIG. 24 is a block diagram showing a circuit in which a dot sequential signal generation circuit 826, a linear interpolation resizing circuit 828, and an LCD_CLK generation circuit 834 are composited.
Figure 25:
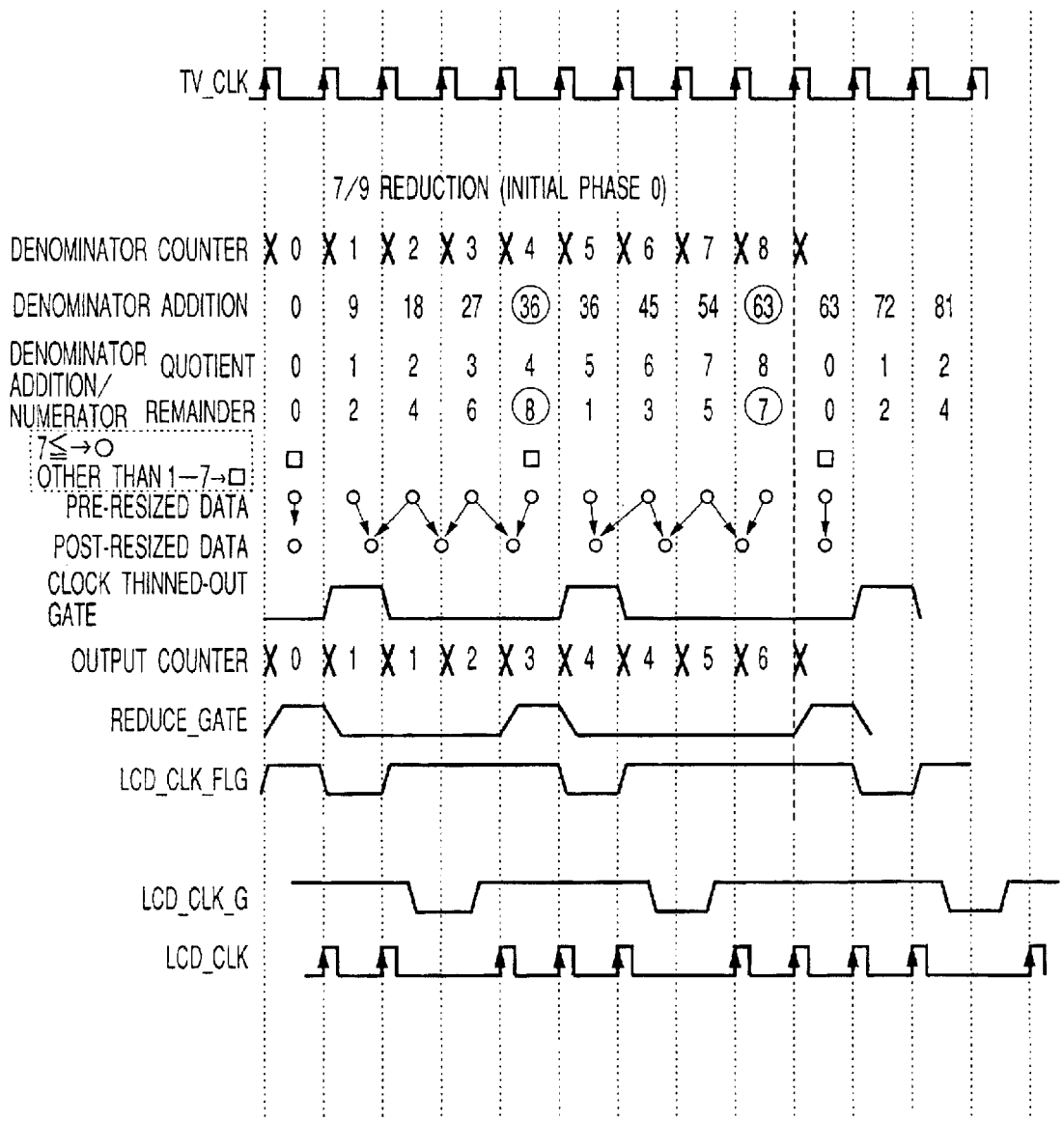
FIG. 25 is a timing chart for the circuit shown in FIG. 24.

FIG. 24 is a block diagram showing a circuit in which the dot sequential signal generation circuit 826, the linear interpolation resizing circuit 828 and the LCD_CLK generation circuit 834 are composited, and FIG. 25 is a timing chart for the circuit of FIG. 24. Hereinafter, the operation of this circuit will be explained with reference to FIGS. 24 and 25.

In FIG. 24, numerals 902 and 904 denote selectors which are equivalent to the selectors 80 and 82 shown in FIG. 3 and select the input G and/or B signals. Numeral 908 denotes an AND circuit which performs an AND operation to least bit data V_COUNT(0) of a vertical line counter and a line change control signal GB_L_CHG, so as to control whether GB or BG is to be changed for each line. Numeral 906 denotes an XOR circuit which performs an XOR operation to the output of the AND circuit 908 and an inverse change control signal GB_INV so as to control whether or not inversion is to be performed. By selecting either 0 or 1 to set the fixed value for each of the line change control signal GB_L_CHG and the inverse change control signal GB_INV, the same signal as the change control signal color CHG in the first embodiment is created.

Numeral 910 denotes an FF which latches the input R signal in response to the clock TV_CLK, numeral 912 denotes an FF which latches the G or B signal from the selector 902 in response to the clock TV_CLK, and numeral 914 denotes an FF which latches the input B or G signal from the selector 904 in response to the clock TV_CLK. Numerals 916 and 918 denote selectors which are equivalent to the selector 84 in the first embodiment of FIG. 3. However, in the present embodiment, the input and output signals of the FF's 910, 912 and 914 are respectively changed by the selectors 916 and 918, whereby continuous two-point data is output to the later-stage linear interpolation resizing circuit 828. The continuous two-point data is changed in RGB dot sequential manner.

Numeral 920 denotes a circuit which creates the change control signal color_count in the first embodiment. On the basis of values 1ST_LINE_ST and 2ND_LINE_ST from registers capable of being independently set, start colors of the first line (odd-number line) and the second line (even-number line) are designated. The obtained values are previously set before the operation, to be adjusted to the delta arrangement on the LCD display panel 838. Further, as shown in FIGS. 4A to 4F, the output order of the R, G and B signals is set for each of the first and second lines. The method of setting the output order was described in the first embodiment. The above operation is the same as that in the first embodiment. It should be noted that the structure composed of the elements 910 to 920 in FIG. 24 corresponds to the RGB dot sequential signal generation circuit 826 in FIG. 23. In the linear interpolation resizing circuit 828, with respect to the continuous two-point data input from the RGB dot sequential signal generation circuit 826, a phase after the resizing is calculated based on a preset resizing rate, and then interpolation data is output by the bilinear operation.

An example of the resizing operation by the bilinear interpolation in case of 7/9 will be explained with reference to a timing chart of FIG. 25. In case of 7/9, seven pixels are output from input nine pixels. FIG. 25 shows down the operation clock TV_CLK of the linear interpolation resizing circuit 828, a denominator counter value obtained by counting the phases of the input data (repeatedly counting 0 to 8), a denominator addition value obtained by adding the denominator value "9" for each input pixel, a denominator addition/numerator quotient value obtained by dividing the above denominator addition value by 7, a denominator addition/numerator remainder value, a □ (white square) mark in a case where the denominator addition/numerator value is 0 or 8 or more, the data phase of the input data to the selector 918, the data phase of the output data from the selector 918, an output counter value (repeating 0 to 6), a gate signal REDUCE_GATE before one clock of no data output, a gate signal LCD_CLK_FLG at no data output timing, and the output clock LCD_CLK gated based on the gate signal LCD_CLK_FLG.

The method of calculating the output data phase is determined based on the denominator addition/numerator remainder value in FIG. 25. Therefore, numeral 922 of FIG. 24 denotes a circuit which calculates the denominator addition/numerator remainder value of FIG. 25 on the basis of the input count value, the denominator addition value, the output count value and the like. In the circuit 922, the denominator counter value, the denominator addition value, and the denominator addition/numerator quotient value are calculated, whereby the denominator addition/numerator remainder value is obtained. Numeral 924 denotes an interpolation coefficient calculation circuit which normalizes an interpolation coefficient to multiply the input data by the denominator addition/numerator remainder value. Numeral 926 denotes a linear interpolation arithmetic circuit. Namely, if it is assumed that a multiplication coefficient is K, the linear interpolation arithmetic circuit 926 performs an arithmetic operation (or calculation) of a×K+b×(K−1)=(a+b)×K−b.

As shown in FIG. 24, if it is assumed that the output data from the selector 916 is given as (a) and the output data from the selector 918 is given as (b), the previous denominator addition/numerator remainder value=7 in the first pixel in FIG. 25. Thus, the output data is calculated by (a):(b)=0:7, and the output=(b). Next, in the second pixel, the previous denominator addition/numerator remainder value=no output because there is the □ mark in the case where this value is 0 or 8 or more, and any output phase does not exist between the first and the second. Next, in the third pixel, since the previous denominator addition/numerator remainder value= 2, the output data is calculated by (a):(b)=5:2, and the output=((a)×$\frac{5}{7}$)+((b)×$\frac{2}{7}$). Next, in the fourth pixel, since the previous denominator addition/numerator remainder value= 4, the output data is calculated by (a):(b)=3:4, and the output=((a)×$\frac{3}{7}$)+((b)×$\frac{4}{7}$). Next, in the fifth pixel, since the previous denominator addition/numerator remainder value= 6, the output data is calculated by (a):(b)=1:6, and the output=((a)×$\frac{1}{7}$)+((b)×$\frac{6}{7}$). Next, in the sixth pixel, the previous denominator addition/numerator remainder value no output because there is the □ mark in the case where this value is 0 or 8 or more, and any output phase does not exist between the first and the second. Next, in the seventh pixel, since the previous denominator addition/numerator remainder value=1, the output data is calculated by (a):(b)=6:1, and the output=((a)×$\frac{6}{7}$)+((b)×$\frac{1}{7}$). Next, in the eighth pixel, since the previous denominator addition/numerator remainder value=3, the output data is calculated by (a):(b)=4:3, and the output=((a)×$\frac{4}{7}$)+((b)×$\frac{3}{7}$). Next, in the ninth pixel, since the previous denominator addition/numerator remainder value= 5, the output data is calculated by (a):(b)=2:5, and the output=((a)×$\frac{2}{7}$)+((b)×$\frac{5}{7}$). Then, the similar operations are repeated.

Further, in the phase that any output pixel does not exist, the gate signal LCD_CLK_FLG=L (low), whereby the clock LCD_CLK is not generated.

The RGB dot sequential data from the linear interpolation arithmetic circuit 926 is latched and held by an FF 930 based on the clock TV_CLK when the gate signal LCD_CLK_FLG=H (high), and only available data is output. At the same time, in order to adjust timing to such the output, the gate signal LCD_CLK_FLG is delayed by an FF 928 to generate a signal LCD_CLK_G. Further, the clock TV_CLK is gated, and thus the output clock LCD_CLK is generated.

As described above, since the clock TV_CLK is gated based on the gate signal LCD_CLK_FLG to generate the output clock LCD_CLK, the clock corresponding to the output data of the linear interpolation resizing circuit 828 is generated. Namely, the LCD_CLK generation circuit 834 generates the LCD clock LCD_CLK based on the thinned-out clock obtained by thinning out the clock TV_CLK in correspondence with the data after the RGB dot sequential signal was resized.

In FIG. 23, numeral 836 denotes the LCD control circuit, and numeral 838 denotes the LCD panel which has the predetermined RGB delta arrangement. The LCD control circuit 836 and the LCD panel 838 are respectively equivalent to the LCD control circuit 536 and the LCD panel 540 in the fourth embodiment. Although each of the LCD control circuits 36 and 336 respectively explained in the first and second embodiments includes the sync separation circuit, it is unnecessary for the LCD control circuits 836 and 536 to include such a sync separation circuit. In the present embodiment, although it is not illustrated, a composite sync signal CSYNC, a composite blanking signal CBLK or the like also acting as a horizontal or vertical sync signal is transferred from the display sync signal generation circuit 830 to the LCD control circuit 836. In the LCD control circuit 836, the clock of the image data available to be displayed and the clock of the other data are separated by using the signal CSYNC or the signal CBLK, and the image is displayed on the LCD panel 838.

Further, it is unnecessary for the LCD control circuit 836 to include the S/P converter 440 included in the LCD control circuits 36 and 336. Namely, since the output of the linear interpolation resizing circuit 828 which is the eight-bit parallel RGB dot sequential signal is received by the LCD control circuit 836, any S/P converter is unnecessary.

Conversely, when the eight-bit parallel RGB dot sequential signal is P/S converted into the four-bit or two-bit serial data on the basis of the output from the linear interpolation resizing circuit 828, it is necessary to provide an S/P converter within the LCD control circuit 836 to inversely convert the received serial data into the eight-bit parallel RGB dot sequential signal. Like the first embodiment, the optimum structures of the linear interpolation resizing circuit 828 and the LCD control circuit 836 only have to be selected according to an environmental situation.

Sixth Embodiment

Figure 26:
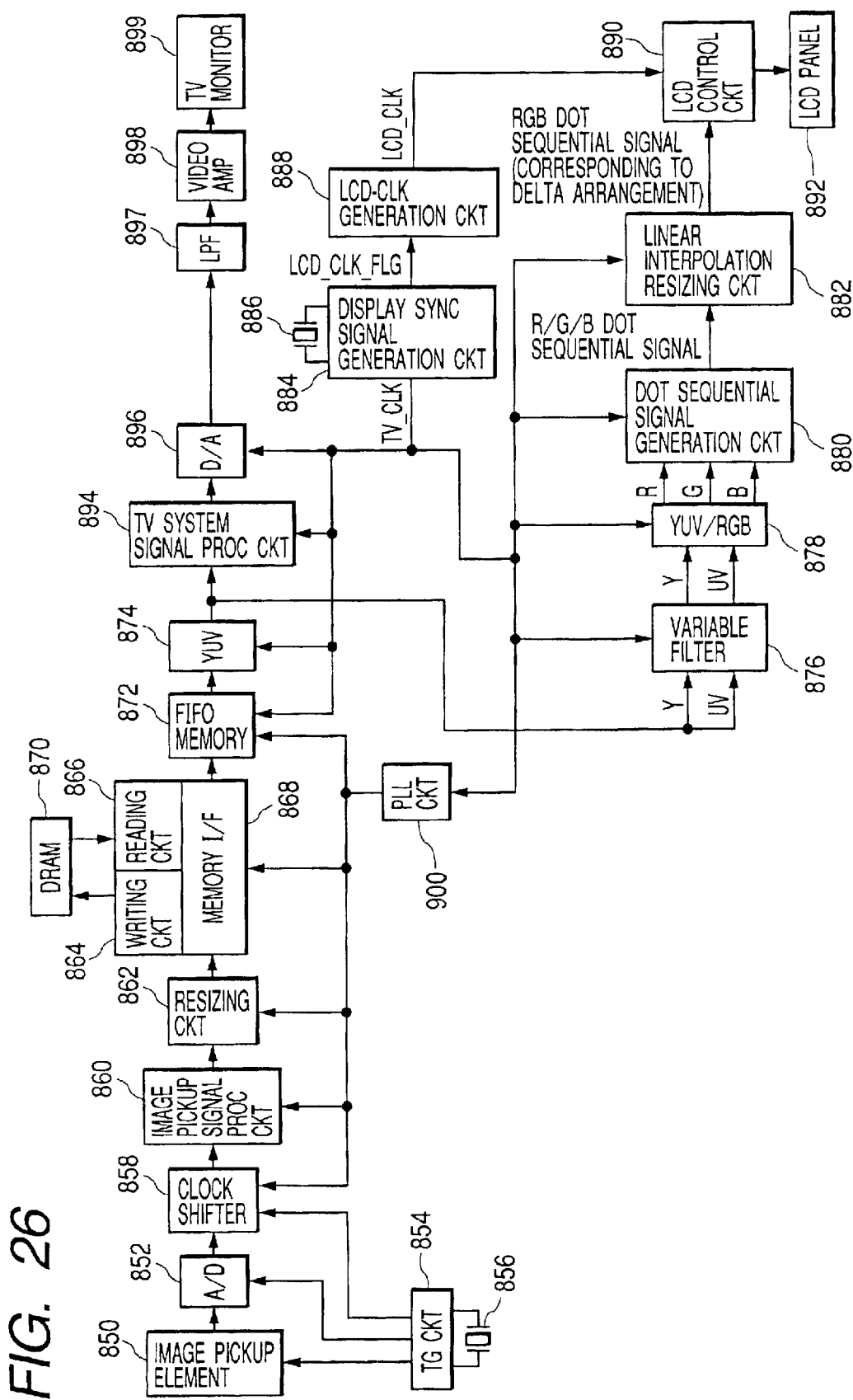
FIG. 26 is a block diagram showing a schematic structure of an image signal processing apparatus according to the sixth embodiment of the present invention.
Figure 27:
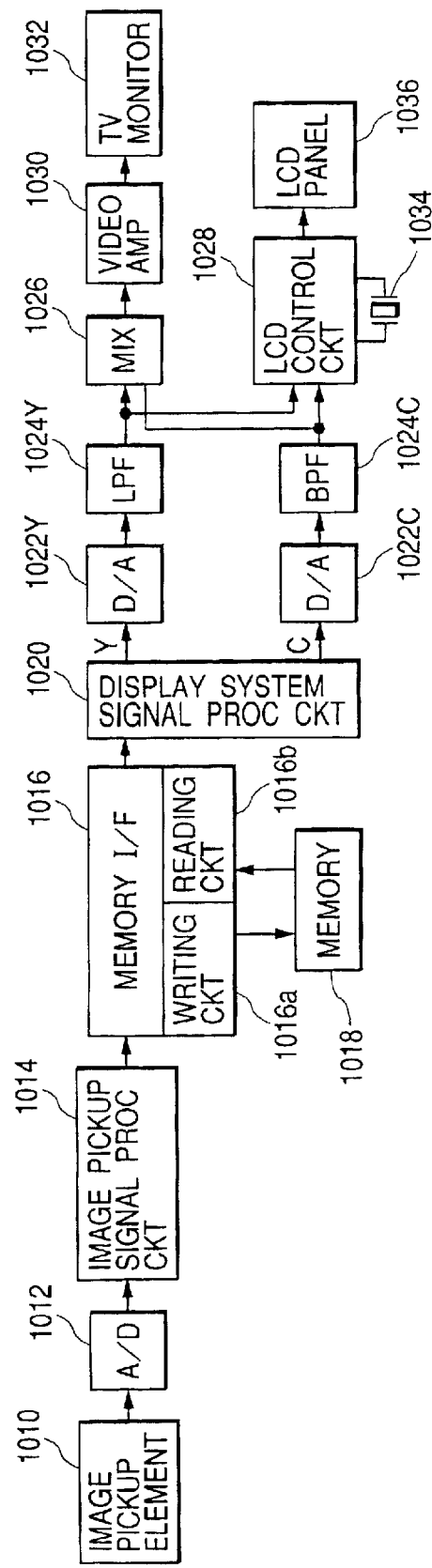
FIG. 27 is a block diagram showing a schematic structure of a conventional image pickup apparatus.
Figure 28:
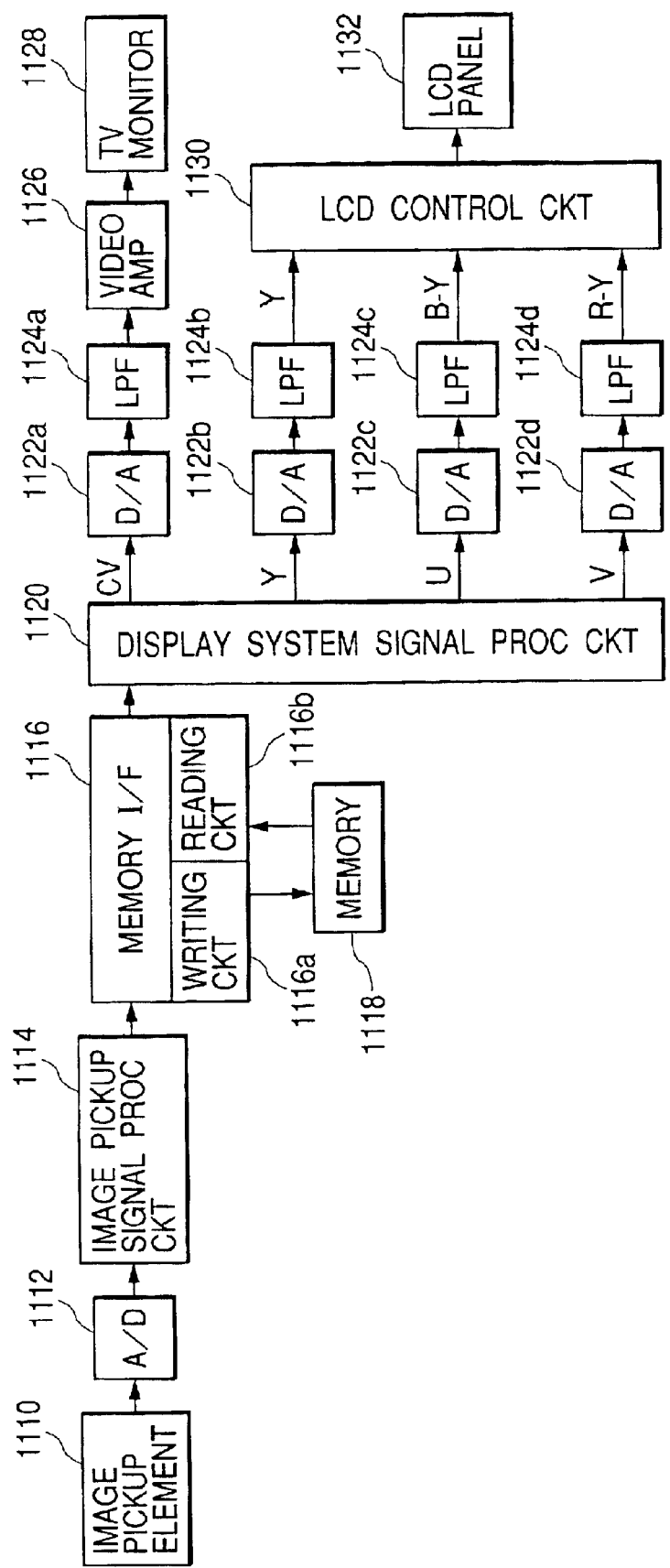
FIG. 28 is a block diagram showing a schematic structure of another conventional image pickup apparatus.

FIG. 26 is a block diagram showing a schematic structure of an image signal processing apparatus according to the sixth embodiment of the present invention. In the present embodiment, as compared with the fifth embodiment, an FIFO memory 872 and a PLL (phase-locked loop) circuit 900 are provided. Hereinafter, a system structure in a case where a clock TV_CLK of a TV display system circuit is asynchronous with a clock of an image pickup signal processing system (an image pickup signal processing circuit 860, a resizing circuit 862, and a memory I/F 868) will be explained.

In FIG. 26, operations of an image pickup element 850, an A/D converter 852, a TG circuit 854, an oscillator 856, a clock shifter 858, the image pickup signal processing circuit 860, the resizing circuit 862, the memory I/F 868 and a DRAM 870 are respectively the same as the operations of the image pickup element 800, the A/D converter 802, the TG circuit 804, the oscillator 806, a clock shifter 808, the image pickup signal processing circuit 810, the resizing circuit 812, the memory I/F 818 and the DRAM 820 shown in FIG. 23.

Numeral 872 denotes the FIFO memory which is the equivalent to the FIFO memories 26, 326, 426 and 525 respectively described in the first, second, third and fourth embodiments. The FIFO memory 872 for buffer converts the image data output from the memory I/F 868 into image data of different data rate.

Numeral 874 denotes a circuit which is equivalent to the YUV422 converter 526 shown in FIG. 18. In the present embodiment, unlike the fourth embodiment, the image data storage format in the VRAM adopts the format of Y:U:V= 4:1:1. Therefore, the YUV422 converter 874 converts the data read in YUV411 format from the VRAM on the DRAM 870 into the data of YUV422 format. Further, the YUV422 converter 874 performs conversion to obtain the level of the YUV signal in NTSC format or PAL format.

In FIG. 26, operations of a variable filter 876, a YUV/RGB converter 878, a dot sequential signal generation circuit 880, a linear interpolation resizing circuit 882, a display sync signal generation circuit 884, an oscillator 886 for oscillating a clock TV_CLK, an LCD_CLK generation circuit 888, an LCD control circuit 890, an LCD panel 892, a TV system signal processing circuit 894, a D/A converter 896, an LPF 897, a video amplifier 898 and a TV monitor 899 are respectively the same as the operations of the variable filter 822, the YUV/RGB converter 824, the dot sequential signal generation circuit 826, the linear interpolation resizing circuit 828, the display sync signal generation circuit 830, the oscillator 832 for oscillating the clock TV_CLK, the LCD_CLK generation circuit 834, the LCD control circuit 836, the LCD panel 838, the TV system signal processing circuit 840, the D/A converter 842, the LPF 844, the video amplifier 846 and the TV monitor 848 shown in FIG. 23.

Numeral 900 denotes the PLL circuit which M/N (M≠N: integers) multiplies the clock TV_CLK transferred from the display sync signal generation circuit 884. The magnification M/N in the PLL circuit 900 is determined according to system processing performance and/or a consumptive current, but independently of a data reading rate of the image pickup element 850 given by the TG circuit 854 or the clock TV_CLK for TV display given by the display sync signal generation circuit 884. Therefore, three clocks of the oscillator 856 for the image pickup element, the oscillator 886 for the TV display, and the PLL circuit 900 are completely asynchronous. In the present embodiment, the PLL circuit 900 is used to omit the oscillator. However, instead of the PLL circuit 900, another crystal oscillator may be used to drive the image pickup element 860, the resizing circuit 862, the memory I/F 868 and the like.

In order to achieve the data transmission and reception in the system which uses the above three kinds of asynchronous clocks, the clock shifter 858 and the FIFO memory 872 exist. The clock shifter 858 performs the shift from the signal of the image pickup clock system to the signal of the image pickup signal processing system and the memory I/F system, and the FIFO memory 872 performs the shift from the signal of the image pickup signal processing system and the memory I/F system to the signal of the TV display system.

The data shifted to the clock of the TV display system by the FIFO memory 872 is converted into the data of YUV422 format (i.e., the format to manage a brightness and a color difference as different bits) by the YUV422 converter 874. The data of YUV422 format is subjected to processes of eliminating noises such as aliasing, etc. and raising a halftone band to increase resolution by the variable filter 876, and then the image data of YUV format output from the variable filter 876 is converted into the image data of RGB format.

As described in the fifth embodiment, the R, G and B signals output from the YUV/RGB converter 878 are input to the dot sequential signal generation circuit 880 to generate the dot sequential signal in RGB time-series manner. The RGB dot sequential signal is then input to the linear interpolation resizing circuit 882 to resize the input signal in spatially continuous data series to match this signal with the LCD panel 892. Besides, the LCD_CLK generation circuit 888 thins out the clock TV_CLK to generate the clock LCD_CLK for the LCD in correspondence with the data after the RGB dot sequential resizing, and then transfers the clock LCD_CLK to the LCD control circuit 890.

As can be easily understood from the above explanation, according the above embodiments, by making the I/F to the LCD control circuit the digital I/F, the D/A converter can be omitted from its previous-stage circuit. Thus, when ASIC is achieved in the previous-stage circuit, the dimensions or size of circuits can be reduced, and thus costs can be reduced.

Further, when the image is displayed on both the TV monitor and the LCD panel simultaneously, the image is previously resized to be matched with the respective display sizes, whereby the beautiful image to which display capabilities of the TV monitor and the LCD panel are maximumly used can be displayed respectively with 100% visual field.

Further, when the image data is resized to be matched with the display size, the spatially continuous data is resized by the linear interpolation, whereby the beautiful image suitable for each display capability can be displayed. Further, in the resizing for the LCD display, such the resizing is performed after the RGB dot sequential signal was created, whereby the dimensions of the resizing circuit can be reduced, and thus costs can be reduced.

Further, since the external display control circuit is provided, the D/A converter in the ASIC can be omitted even if the image is displayed on the TV monitor, whereby the dimensions of the circuit in the ASIC can be reduced, and thus costs can be further reduced.

It is needless to say that the object of the present invention can be achieved in a case where a storage medium storing the program codes of software to achieve the functions of the above embodiments is supplied to a system or an apparatus and then a computer (CPU or MPU) in the system or the apparatus reads and executes the program codes stored in the memory medium.

In this case, the program codes themselves read from the storage medium achieve the functions of the above embodiments, and the storage medium storing such program codes constitutes the present invention.

The storage medium storing the program codes can be, e.g., a floppy disk, a hard disk, an optical disk, a magnetooptical disk, a CD-ROM, a CD-R, a magnetic tape, a non-volatile memory card, a ROM, an EEPROM, or the like.

It is needless to say that the present invention also includes not only the case where the functions of the above embodiments are achieved by the execution of the program codes read by the computer, but also a case where an OS (operating system) or the like functioning on the computer executes all or a part of the process according to instructions by the program codes, thereby achieving the functions of the embodiments.

Further, it is needless to say that the present invention further includes a case where the program codes read from the storage medium are once stored in a memory provided in a function expansion board inserted in the computer or a function expansion unit connected to the computer, and a CPU or the like provided in the function expansion board or the function expansion unit executes all or a part of the process according to instructions by such program codes, thereby achieving the functions of the above embodiments.

Further, the present invention is applicable to a system composed of plural pieces of equipment or to an apparatus including a single piece of equipment.

Further, it is needless to say that the present invention is applicable to a case where a program is supplied to a system or an apparatus to achieve the functions of the above embodiments. In this case, if a storage medium storing the program represented by software for achieving the present invention is read by the system or the apparatus, such system or apparatus can derive the effect of the present invention.

Further, if the program represented by software for achieving the present invention is downloaded and read from a database on a network by a communication program, such system or apparatus can derive the effect of the present invention.

As many apparently and widely different embodiments can be made without departing from the spirit and scope of the present invention, it is to be understood that the present invention is not limited to the above embodiments except as defined in the appended claims.

What is claimed is:

1. An image processing apparatus comprising:
    an image capture unit adapted to capture an image;
    a resizing unit adapted to resize the captured image and output a resized image;
    a memory unit adapted to store the resized image;
    a first conversion unit adapted to convert the resized image stored in said memory unit into an RGB image; and
    a second conversion unit adapted to convert the RGB image output from said first conversion unit into a plurality of serial data,
    wherein said second conversion unit is adapted to convert the RGB image into two or four serial data.

2. An image processing apparatus comprising:
    an image capture unit adapted to capture an image;
    a resizing unit adapted to resize the captured image and output a resized image;
    a memory unit adapted to store the resized image;
    a first conversion unit adapted to convert the resized image stored in said memory unit into an RGB image; and
    a second conversion unit adapted to convert the RGB image output from said first conversion unit into a plurality of serial data,
    wherein said second conversion unit is adapted to convert the RGB image into dot sequential data before the RGB image is converted into the plurality of serial data.

3. An image processing apparatus according to claim 2, further comprising:
    a display unit adapted to display an RGB image using the plurality of serial data output from said second conversion unit.

4. An image processing apparatus according to claim 1, further comprising:
    a display unit adapted to display an RGB image using the plurality of serial data output from said second conversion unit.

5. An image processing apparatus according to claim 1, wherein the resized image is a YUV image.

6. An image processing apparatus for processing an inputted image, said apparatus comprising:
    a first resizing unit adapted to resize the inputted image and output a resized image;
    a memory unit adapted to store the resized image;
    a second resizing unit adapted to further resize the resized image stored in said memory unit and output a further resized image;
    a first conversion unit adapted to convert the further resized image into an RGB image;
    a second conversion unit adapted to convert the RGB image into a plurality of serial data; and
    a third conversion unit adapted to convert the resized image stored in said memory unit into an image for a TV monitor.

7. An image processing apparatus according to claim 6, wherein said second conversion unit is adapted to convert the RGB image into two or four serial data.

8. An image processing apparatus according to claim 6, further comprising:
    a display unit adapted to display an RGB image using the plurality of serial data output from said second conversion unit.

9. An image processing apparatus according to claim 6, wherein the inputted image is a YUV image.

10. An image processing apparatus according to claim 6, further comprising:
    an image capture unit adapted to capture the inputted image; and
    a display unit adapted to display an RGB image using the plurality of serial data output from said second conversion unit.

11. An image processing apparatus comprising:
    an image capture unit adapted to capture an image;
    a resizing unit adapted to resize the captured image and output a resized image;
    a memory unit adapted to store the resized image;
    a first conversion unit adapted to convert the resized image stored in said memory unit into an image for a TV monitor; and
    a second conversion unit adapted to convert the image for TV monitor output from said first conversion unit into a plurality of serial data,
    wherein said second conversion unit is adapted to convert image for the TV monitor into two or four serial data.

12. An image processing apparatus according to claim 11, wherein the resized image is a YUV image.

13. An image processing apparatus comprising:
    an image capture unit adapted to capture an image;
    a first resizing unit adapted to resize the captured image and output a resized image;
    a memory unit adapted to store the resized image;
    a first conversion unit adapted to convert the resized image stored in said memory unit into an RGB image;
    a second resizing unit adapted to resize the RGB image and output the resized RGB image serially, and
    a second conversion unit adapted to convert the RGB image into dot sequential data before the RGB image is resized by said second resizing unit.

14. An image processing apparatus according to claim 13, further comprising:
    a display unit adapted to display the resized RGB image output from said second resizing unit.

15. An image processing apparatus according to claim 13, wherein the resized image is a YUV image.

16. An image processing apparatus according to claim 13, further comprising:
    a third conversion unit adapted to convert the resized image stored in said memory unit into an image for a TV monitor.

17. An image processing apparatus for processing an inputted image, said apparatus comprising:
    a resizing unit adapted to resize the inputted image and output a resized image;
    a memory unit adapted to store the resized image;
    a first conversion unit adapted to convert the resized image stored in said memory unit into an RGB image; and
    a second conversion unit adapted to convert the RGB image output from said first conversion unit into a plurality of serial data, wherein said second conversion unit is adapted to convert the RGB image into two or four serial data.

18. An image processing apparatus for processing an inputted image, said apparatus comprising:
- a resizing unit adapted to resize the inputted image and output a resized image;
- a memory unit adapted to store the resized image;
- a first conversion unit adapted to convert the resized image stored in said memory unit into an RGB image; and
- a second conversion unit adapted to convert the RGB image output from said first conversion unit into a plurality of serial data,
- wherein said second conversion unit is adapted to convert the RGB image into dot sequential data before the RGB image is converted into the plurality of serial data.

19. An image processing apparatus for processing an inputted image, said apparatus comprising;
- a resizing unit adapted to resize the inputted image and output a resized image;
- a memory unit adapted to store the resized image;
- a first conversion unit adapted to convert the resized image stored in said memory unit into an image for a TV monitor; and
- a second conversion unit adapted to convert the image for the TV monitor output from said first conversion unit into a plurality of serial data,
- wherein said second conversion unit is adapted to convert the image for the TV monitor into two or four serial data.

20. An image processing apparatus for processing an inputted image, said apparatus comprising:
- a first resizing unit adapted to resize the inputted image to provide a resized image;
- a memory unit adapted to store the resized image;
- a first conversion unit adapted to convert the resized image stored in said memory unit into an RGB image;
- a second resizing unit adapted to resize the RGB image and output the resized RGB image serially; and
- a second conversion unit adapted to convert the RGB image into dot sequential data before the RGB image is resized by said second resizing unit.

21. An image processing apparatus according to claim 2, wherein the resized image is a YUV image.

22. An image processing apparatus according to claim 17, further comprising:
- a display unit adapted to display an RGB image using the plurality of serial data output from said second conversion unit.

23. An image processing apparatus according to claim 17, wherein the resized image is a YUV image.

24. An image processing apparatus according to claim 18, further comprising:
- a display unit adapted to display an RGB image using the plurality of serial data output from said second conversion unit.

25. An image processing apparatus according to claim 18, wherein the resized image is a YUV image.

26. An image processing apparatus according to claim 19, wherein the resized image is a YUV image.

27. An image processing apparatus according to claim 20, further comprising:
- a display unit adapted to display the resized RGB image output from said second resizing unit.

28. An image processing apparatus according to claim 20, wherein the resized image is a YUV image.

29. An image processing apparatus according to claim 20, further comprising:
- a third conversion unit adapted to convert the resized image stored in said memory unit into an image for a TV monitor.

* * * * *

UNITED STATES PATENT AND TRADEMARK OFFICE
CERTIFICATE OF CORRECTION

| | | |
|---|---|---|
| PATENT NO. | : 7,136,110 B2 | |
| APPLICATION NO. | : 09/878936 | |
| DATED | : November 14, 2006 | |
| INVENTOR(S) | : Honma et al. | |

It is certified that error appears in the above-identified patent and that said Letters Patent is hereby corrected as shown below:

IN THE DRAWINGS:
Sheet No. 20 of 27, Figure 21, "CLK'S" (both occurrences) should read --CLKs--.

COLUMN 2:
Line 33, "LPF's" should read --LPFs--.
Line 36, "LPF's" should read --LPFs--.
Line 38, "LPF's" should read --LPFs--.

COLUMN 3:
Line 33, "ASIC's" should read --ASICs--.

COLUMN 4:
Line 35, "RGM" should read --RGB--.

COLUMN 9:
Line 7, "form" should read --from--.

COLUMN 10:
Line 56, "color CHG" should read --color_CHG--.

COLUMN 11:
Line 39, "FF's" should read --FFs--.
Line 53, "FF's" should read --FFs--.

COLUMN 12:
Line 1, "FF's" should read --FFs--.
Line 6, "FF's" should read --FFs--.
Line 9, "FF's" should read --FFs--.
Line 10, "FF's" should read --FFs--.
Line 18, "FF's" should read --FFs--.

COLUMN 13:
Line 32, "FF's" should read --FFs--.
Line 34, "FF's" should read --FFs--.
Line 36, "FF's" should read --FFs--.
Line 37, "FF's" should read --FFs--.
Line 40, "FF's" should read --FFs--.
Line 42, "FF's" should read --FFs--.
Line 43, "FF's" should read --FFs--.
Line 45, "FF's" should read --FFs--.

UNITED STATES PATENT AND TRADEMARK OFFICE
CERTIFICATE OF CORRECTION

PATENT NO.       : 7,136,110 B2
APPLICATION NO.  : 09/878936
DATED            : November 14, 2006
INVENTOR(S)      : Honma et al.

It is certified that error appears in the above-identified patent and that said Letters Patent is hereby corrected as shown below:

COLUMN 22:
Line 45, "1·2·2·1·2·2·1·2·2·1·2·2·1·2·2·1·2·2·1·2·2·1·2·2·1·2·2·2·1·2·2·2"
should read
--1·2·2·1·2·2·1·2·2·1·2·2·1·2·2·1·2·2·1·2·2·1·2·2·1·2·2·2·1·2·2·2--.
Line 53, "1·2·1·2·2·1·2·2·1·2·1·2·2·1·2·2·1·2·1·2·2·1·2·2·1·2·1·2·2·1·2·2"
should read
--1·2·1·2·2·1·2·2·1·2·1·2·2·1·2·1·2·1·2·2·1·2·2·1·2·1·2·2·1·2·2--.

COLUMN 23:
Line 9, "LCD CLK" should read --LCD_CLK--.
Line 15, "FF's" should read --FFs--.
Line 54, "FF's" should read --FFs--.

COLUMN 25:
Line 22, "FF's" should read --FFs--.

COLUMN 26:
Line 12, "FF's" should read --FFs--.

COLUMN 29:
Line 64, "color CHG" should read --color_CHG--.

COLUMN 30:
Line 7, "FF's" should read --FFs--.

COLUMN 31:
Line 23, "value no" should read --value = no--.

COLUMN 36:
Line 41, "serially," should read --serially;--.

UNITED STATES PATENT AND TRADEMARK OFFICE
CERTIFICATE OF CORRECTION

PATENT NO. : 7,136,110 B2
APPLICATION NO. : 09/878936
DATED : November 14, 2006
INVENTOR(S) : Honma et al.

It is certified that error appears in the above-identified patent and that said Letters Patent is hereby corrected as shown below:

COLUMN 37:
Line 19, "comprising;" should read --comprising:--.

Signed and Sealed this

Eighth Day of July, 2008

JON W. DUDAS
*Director of the United States Patent and Trademark Office*